US009288468B2

(12) United States Patent
Vaught et al.

(10) Patent No.: US 9,288,468 B2
(45) Date of Patent: Mar. 15, 2016

(54) VIEWING WINDOWS FOR VIDEO STREAMS

(75) Inventors: Benjamin I. Vaught, Seattle, WA (US);
Alex Aben-Athar Kipman, Redmond, WA (US); Michael J. Scavezze, Bellevue, WA (US); Arthur C. Tomlin, Bellevue, WA (US); Relja Markovic, Seattle, WA (US); Darren Bennett, Seattle, WA (US); Stephen G. Latta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 13/172,633

(22) Filed: Jun. 29, 2011

(65) Prior Publication Data

US 2013/0002813 A1    Jan. 3, 2013

(51) Int. Cl.
*H04N 13/00* (2006.01)
*H04N 13/04* (2006.01)
*G09G 5/00* (2006.01)
*H04N 21/2187* (2011.01)
*H04N 21/274* (2011.01)

(52) U.S. Cl.
CPC ....... *H04N 13/0048* (2013.01); *H04N 13/0059* (2013.01); *H04N 13/044* (2013.01); *H04N 13/0484* (2013.01); *H04N 21/2187* (2013.01); *H04N 21/274* (2013.01)

(58) Field of Classification Search
CPC ..................... G02B 27/017; G02B 2027/0187; G02B 2027/0138
See application file for complete search history.

(56) References Cited

U.S. PATENT DOCUMENTS

| 5,200,827 A | 4/1993 | Hanson et al. |
| 6,133,944 A | 10/2000 | Braun et al. |

(Continued)

FOREIGN PATENT DOCUMENTS

| EP | 1637923 A2 | 3/2006 |
| JP | 08-019004 A | 1/1996 |
| JP | 09-009301 A | 1/1997 |
| JP | 11-202257 A | 7/1999 |
| JP | 2007-219069 A | 8/2007 |

OTHER PUBLICATIONS

Cho et al., "A Gaze Tracking Method as an IPTV Interface," Proceedings of the 12th International Conference on Advanced Communication Technology (ICACT), vol. 2 Feb. 7-10, 2010, Phoenix Park, pp. 1699-1703.

(Continued)

*Primary Examiner* — Joseph Ustaris
*Assistant Examiner* — Rebecca Volentine
(74) *Attorney, Agent, or Firm* — Aaron Chatterjee; Kate Drakos; Micky Minhas

(57) ABSTRACT

Techniques are provided for viewing windows for video streams. A video stream from a video capture device is accessed. Data that describes movement or position of a person is accessed. A viewing window is placed in the video stream based on the data that describes movement or position of the person. The viewing window is provided to a display device in accordance with the placement of the viewing window in the video stream. Motion sensors can detect motion of the person carrying the video capture device in order to dampen the motion such that the video on the remote display does not suffer from motion artifacts. Sensors can also track the eye gaze of either the person carrying the mobile video capture device or the remote display device to enable control of the spatial region of the video stream shown at the display device.

20 Claims, 18 Drawing Sheets

(56) References Cited

U.S. PATENT DOCUMENTS

| | | | |
|---|---|---|---|
| 6,307,526 B1 * | 10/2001 | Mann | 345/8 |
| 6,839,041 B2 * | 1/2005 | Susnfara et al. | 345/8 |
| 7,042,497 B2 | 5/2006 | Gullichsen et al. | |
| 7,263,207 B2 | 8/2007 | Lee et al. | |
| 8,218,006 B2 * | 7/2012 | De Mers et al. | 348/144 |
| 8,692,845 B2 * | 4/2014 | Fedorovskaya et al. | 345/619 |
| 2002/0082498 A1 | 6/2002 | Wendt et al. | |
| 2004/0246463 A1 | 12/2004 | Milinusic | |
| 2008/0002262 A1 * | 1/2008 | Chirieleison | 359/630 |
| 2008/0049196 A1 | 2/2008 | Wang et al. | |
| 2008/0165280 A1 * | 7/2008 | Deever et al. | 348/497 |
| 2010/0013739 A1 * | 1/2010 | Sako et al. | 345/8 |
| 2010/0019992 A1 * | 1/2010 | Maguire, Jr. | 345/8 |
| 2010/0079356 A1 * | 4/2010 | Hoellwarth | 345/8 |
| 2011/0243532 A1 * | 10/2011 | Bostaph et al. | 386/278 |
| 2012/0050142 A1 * | 3/2012 | Border et al. | 345/8 |
| 2012/0092348 A1 * | 4/2012 | McCutchen | 345/474 |
| 2012/0105654 A1 * | 5/2012 | Kwatra et al. | 348/208.4 |
| 2012/0154557 A1 * | 6/2012 | Perez et al. | 348/53 |
| 2012/0306725 A1 * | 12/2012 | Hilkes | 345/8 |

OTHER PUBLICATIONS

Kawamura et al., "A Novel Video Retrieval Method to Support a User's Recollection of Past Events Aiming for Wearable Information Playing," Proceedings of the Second IEEE Pacific Rim Conference on Multimedia: Advances in Multimedia Information Processing, Oct. 24-26, 2001, Bejing, China, Springer 2001, 8 pages.

Persa, Stelian-Florin, "Sensor Fusion in Head Pose Tracking for Augmented Reality," Master's Thesis, Technical University of Delft, Jun. 6, 2006, Delft, Wöhrmann Print Service, The Netherlands, 184 pages.

Fong, Stew Wan, "Mixed Reality Entertainment with Wearable Computers." Master's Thesis, National University of Singapore, 2003, 175 pages, [retrieved on May 9, 2011] Retrieved from the Internet: <URL:http://scholarbank.nus.edu.sg/bitstream/handle/10635/14271/FongSiewWan__MEngThesis.pdf?sequence=1>.

International Search Report and Written Opinion of the International Searching Authority dated Jan. 14, 2013, PCT International Application No. PCT/US2012/044900, filed Jun. 29, 2012, 8 pages.

English Abstract of Foreign Patent Document JP09-009301, published Jan. 10, 1997, Applicant Victor Co of Japan Ltd, 1 page.

English Abstract of Foreign Patent Document JP2007-219069, published Aug. 30, 2007, Applicant Konica Minolta Photo Imaging Inc., 1 page.

English Abstract of Foreign Patent Document JP11-202257, published Jul. 30, 1999, Applicant Sony Corp, 2 pages.

English Abstract of Foreign Patent Document JP08-019004, published Jan. 19, 1996, Applicant Victor Co of Japan Ltd., 2 pages.

* cited by examiner

VIEWING WINDOWS FOR VIDEO STREAMS

BACKGROUND

It is becoming more popular for users to carry a video camera with them. For example, head mounted cameras are becoming more popular. Of course, users may also carry other devices, such as cellular telephones, that are capable of capturing video. Herein, a video capture device that may be carried by or worn by a person is referred to as a "mobile video capture device." Sharing the video stream captured by a mobile video capture device with a remote display device allows others to see life from the eyes of another person. While this content is compelling, it also presents new challenges to improve accessibility, usability and viewpoint control. One specific problem is that the video stream may appear very unstable at the remote display due to motion of the person having the mobile video capture device.

It is also becoming more common for users to carry electronic devices that are capable of displaying video. Head-mounted display (HMD) devices are one such example. Viewing video content through HMDs presents challenges. This is especially true when viewing video was captured from a mobile video capture device. An HMD is one example of a "mobile video display device." Other examples of mobile video display devices include, but are not limited to, cellular telephones, laptop computers, and notebook computers.

SUMMARY

Techniques are provided for placing viewing windows within video streams. A viewing window may be a spatial subset of the video stream that is presented on a display device. Viewing windows may provide the ability to dampen motion of a person carrying the video capture device such that the video on a display (e.g., remote display device) does not suffer from motion artifacts. Viewing windows may also allow control of what spatial portion of the video stream gets presented. Either the person carrying the video capture device or the person watching the video may exercise this control. Control may also be exercised programmatically on behalf of the person recording or watching the video. Viewing windows may also be used to help focus objects in a 3D display. The decision of where to place a viewing window may be based on data that is related to the position or motion of a person, such as the person capturing the video or the person watching the video. Motion sensors can detect motion of the person carrying the mobile video capture device. Sensors can also determine the direction of eye gaze of a person.

One embodiment includes a method for display video. The method may include accessing a video stream from a video capture device. The capture device may be either a mobile or a stationary capture device. Data that describes movement or position of a person is accessed. A viewing window is placed in the video stream based on the data that describes movement or position of the person. The viewing window is provided to a display device in accordance with the placement of the viewing window in the video stream.

One embodiment includes system comprising the following. The system has a mobile video capture device, at least one sensor which detects motion of a person that carries the mobile video capture device, and a control circuit which receives a video stream from the mobile video capture device. The control circuit determines at least one viewing window within the video stream that dampens motion of the person.

One embodiment includes a method for displaying 3D video. At least a portion of a 3D video stream is transmitted from a mobile video capture device to a remote display device. The 3D video stream has a right stream with video frames and a left stream with video frames. Movement data that describes movement of a first person that carries the mobile video capture device is accessed. A first viewing window is positioned in each frame of the right stream based on the movement data, and a second viewing window is positioned in each frame of the left stream based on the movement data. The viewing windows compensate for the movement of the first person. The first and second viewing windows are displayed on the remote display device.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

DETAILED DESCRIPTION

Techniques are provided for placing viewing windows within video streams. A viewing window may be a spatial subset of the video stream that is presented on a display device. Viewing windows may provide the ability to dampen motion of a person carrying the video capture device such that the video on display (e.g., remote display) does not suffer from motion artifacts. Viewing windows may also allow control of what spatial portion of the video stream gets presented. Either the person carrying the video capture device or the person watching the video may exercise this control. Control may also be exercised programmatically on behalf of the person recording or watching the video. Viewing windows may also be used to help focus objects in a 3D display.

The decision of where to place a viewing window may be based on data that is related to the position or motion of a person, such as the person capturing the video or the person watching the video. Motion sensors can detect motion of the person carrying the mobile video capture device. Sensors can also track the direction of eye gaze of the person carrying the mobile video capture device such that they are able to control what spatial region of the video stream is shown at the display device. The display can be an HMD that is carried by a second person. Sensors can track the direction of eye gaze of the person wearing the HMD such that they are able to control what spatial region of the video stream is shown at the HMD.

Figure 1A:
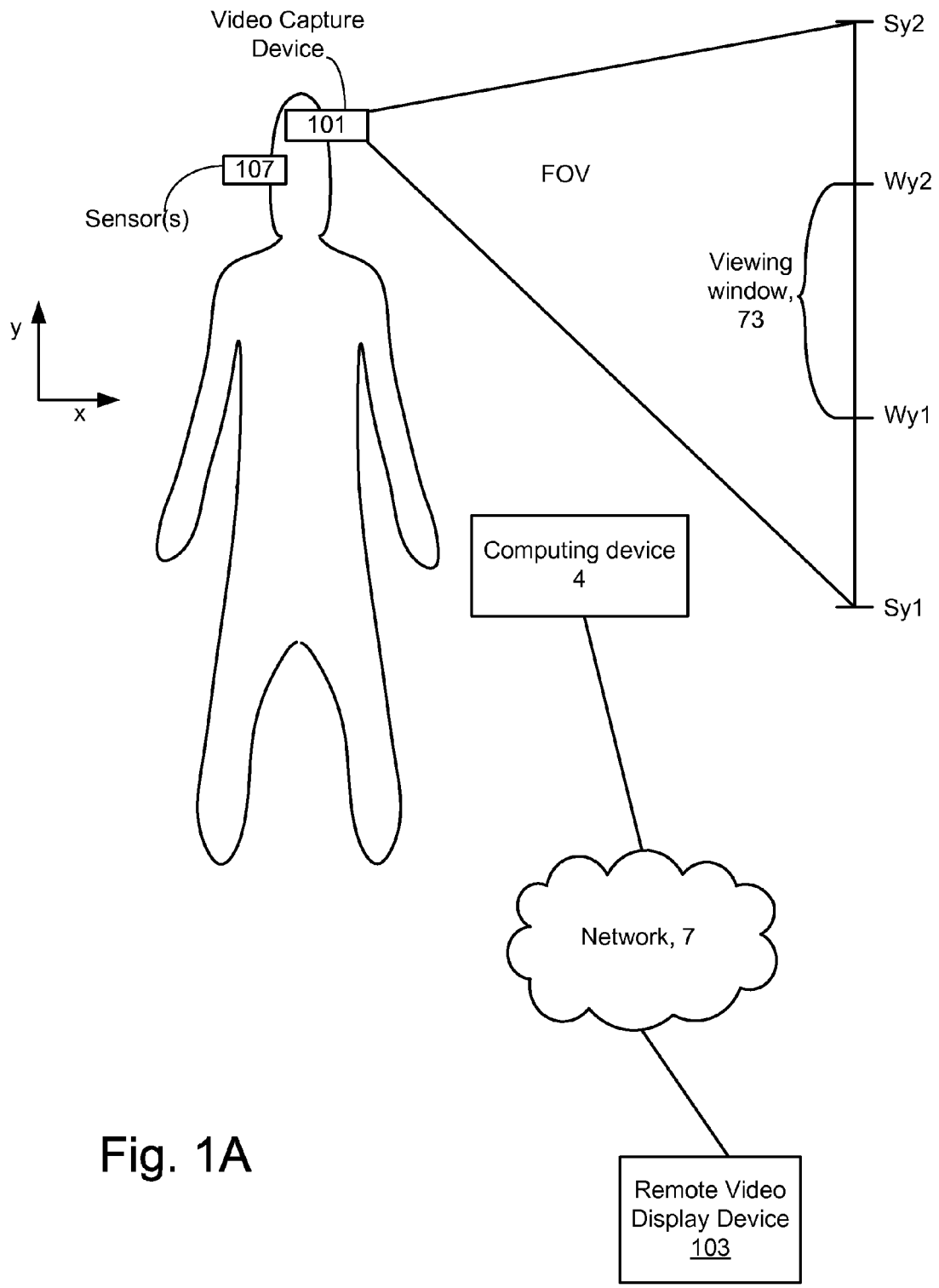
FIGS. 1A, 1B, 1C and 1D depict example environments in which embodiments may be practiced.

FIG. 1A depicts one example of an environment in which embodiments may be practiced. In this embodiment, a person carries a video capture device 101. The term "carry" in the context of "carrying a device" as used throughout this description includes any way that a person might take the device with them, such as by wearing the device (e.g., a pair of glasses), affixing the device to clothing, holding onto the device, etc. A video capture device that is carried by someone may be referred to herein as a "mobile video capture device." Example devices that a user may carry include mobile video capture devices, mobile video display devices, and sensors (such as motion sensors).

The video capture device 101 may be part of an HMD apparatus, but that is not required. In this embodiment, the person also carries one or more sensors 107 that are able to detect motion and/or position of the person or a body part. The sensors 107 may also be part of the HMD, but that is not required either. In some embodiments, the sensors 107 are not carried by the person. For example, a sensor on a device near the person may be used. Example sensors 107 include, but are not limited to, accelerometers, gyroscopes, and other inertial measurement units. These one or more sensors 107 may be used to detect motion that should be dampened, as one example. The mobile video capture device 101 and sensors 107 are in communication with a computing device 4 by either wireless or wireline communication. The computing device 4 is able to generate a video stream based on image data captured by the mobile video capture device 101. This may be a 2D video stream or a 3D video stream.

The computing device 4 may send the video stream to a remote video display device 103 via the network 7. The remote display device 103 could be an HMD that is carried by a second person. However, the remote display device 103 could also be any other type of device that is capable of displaying video such as, but not limited to, a cellular telephone, a laptop computer, a notebook computer, a desktop computer, etc. Thus, the remote video display device 103 may be a mobile video display device, but that is not required. For example, a desktop computer is typically not considered to be mobile.

The network 7 may be a local area network (LAN), wide area network (WAN), etc. In one embodiment, the video stream is transmitted over the Internet. In one embodiment, the video stream is transmitted over a cellular telephone network. The video stream may be transmitted over any combination of these or other networks. Note that the video stream may include a right stream and a left stream for a 3D video stream. Note that throughout this disclosure, the term "video stream" will be understood to include both a 2D video stream and a 3D video stream. Thus, throughout this disclosure the term video stream will be understood to include a 3D video stream having a right video stream and a left video stream. Also note that the data that is transferred over the network 7 may include depth data that is separate from the video stream. For example, a depth camera may be used to generate a depth data. Further details of depth data are discussed below.

The mobile video capture device 101 captures image data from a field of view (FOV). In some embodiments, rather than displaying everything in the FOV at the remote video display device 103, only a portion of the FOV is displayed. Moreover, the portion of the FOV that is presented may be moved over time to accomplish some purpose. In one embodiment, this is used to dampen motion of the person that carries the mobile video capture device 101. For example, the motion sensors may be used to determine that the head of the person having the mobile video capture device 101 is bouncing up and down (e.g., due to the person walking). This means that the FOV may move over time due to the mobile video capture device 101 moving. However, by selecting which portion of the FOV is presented at the remote display device 103, these motion artifacts may be dampened. As a particular example, the FOV may have various objects that are held relatively steady at the remote video display device despite the motion artifacts.

Figure 2A:
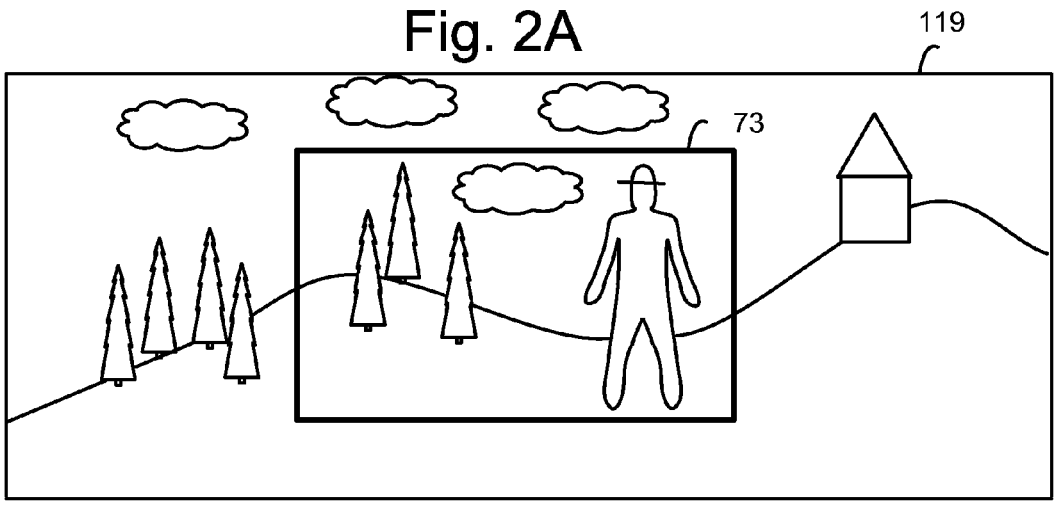
FIGS. 2A, 2B and 2C depict one embodiment of placing a viewing window in a video stream.
Figure 2B:
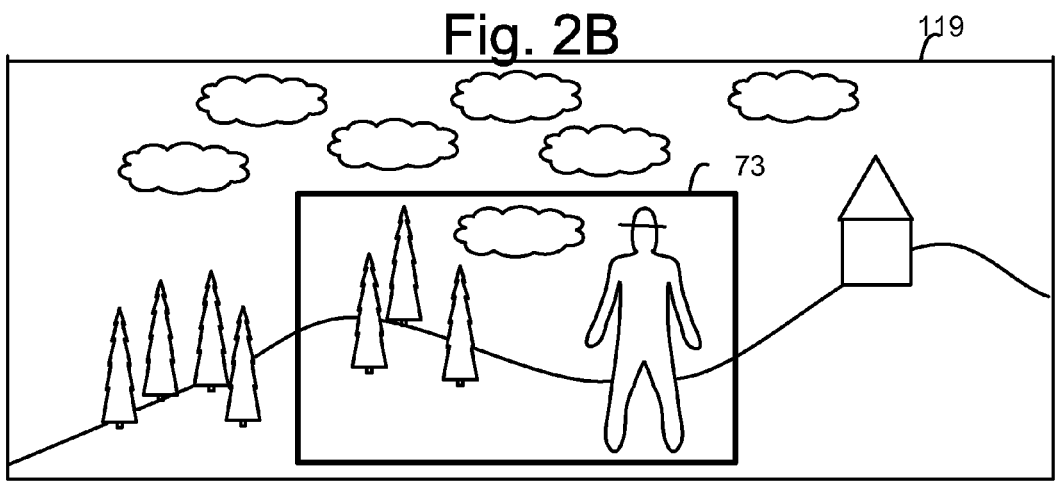
Figure 2C:
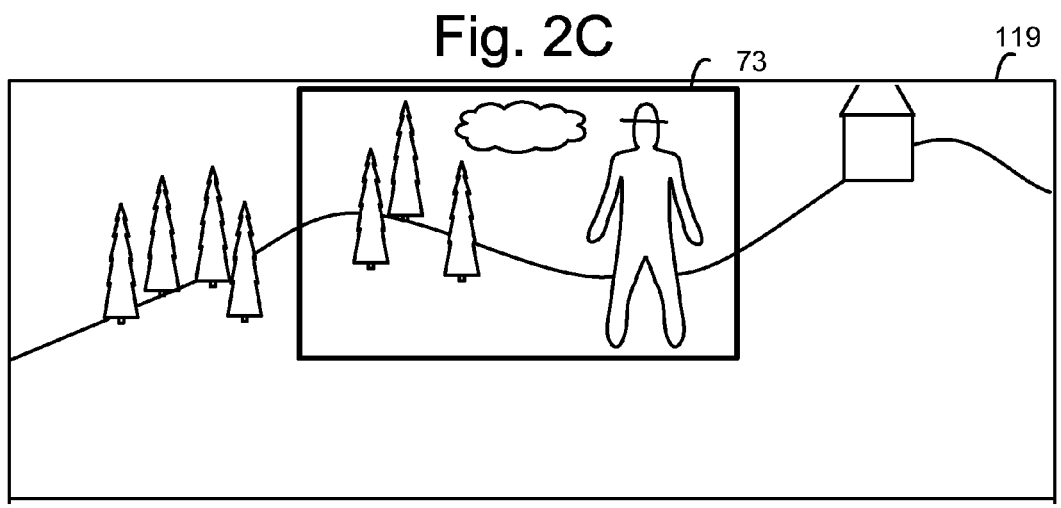

Referring briefly to FIGS. 2A-2C, the entire FOV is represented by full video screen 119. The full video screen 119 represents three different video frames that are captured at the video capture device 101. In this example, the full video screen 119 moves up and down as the person walks. Within the full video screen 119 is a viewing window 73. In one embodiment, it is the viewing window 73 that is displayed on the remote display device 103. The viewing window 73 may be moved from one video frame to the next (e.g., moved spatially within the video stream) such that it contains approximately the same viewpoint from one frame to the next. Thus, the motion of the person walking is dampened. Note that for a 3D video signal there may be a viewing window 73 for a right video stream and another viewing window 73 for the left video stream.

The full video screen 119 represents a potential screen that could be displayed if all of the captured video were used, in this embodiment. For example, the video capture device 101 may have an image sensor having an array of pixels. The image sensor may capture a set of image data multiple times each second. Image data from the sensor may correspond to the FOV of the video capture device for some period in time. Herein, this may be referred to as the full FOV or the full video screen 119.

Referring again to FIG. 1A, an axis that depicts a range within the FOV along the y-axis is depicted at an arbitrary distance from the video capture device 101. The range of the FOV extends from $Sy1$ to $Sy2$. The viewing window 73 extends from $Wy1$ to $Wy2$ on this arbitrary y-axis. If the person's head were to bob up and down, then the FOV may also bob up and down, as discussed with respect to FIGS.

2A-2C. To dampen these "motion artifacts" the viewing window 73 may be kept in approximately the range of point Wy1 to Wy2. Note that to dampen these motion artifacts, it is not required that the viewing window 73 be fixed at exactly the range between point Wy1 to Wy2. The dampening may also be used for other directions, such as along the x-axis.

Note that that the processing of the video stream to select which portion of the FOV is presented on the remote display device 103 could be performed at any computing device. For example, the processing could be performed prior to transferring over the network 7 or after. Therefore, the computing device 4 might transfer the entire video stream, or only selected portions thereof. An example of transferring selected portions is to determine some viewing window 73 within each frame of the video stream and only transmit that portion of each video frame. Thus, the selection may be of same spatial portion of the video stream.

Figure 1B:
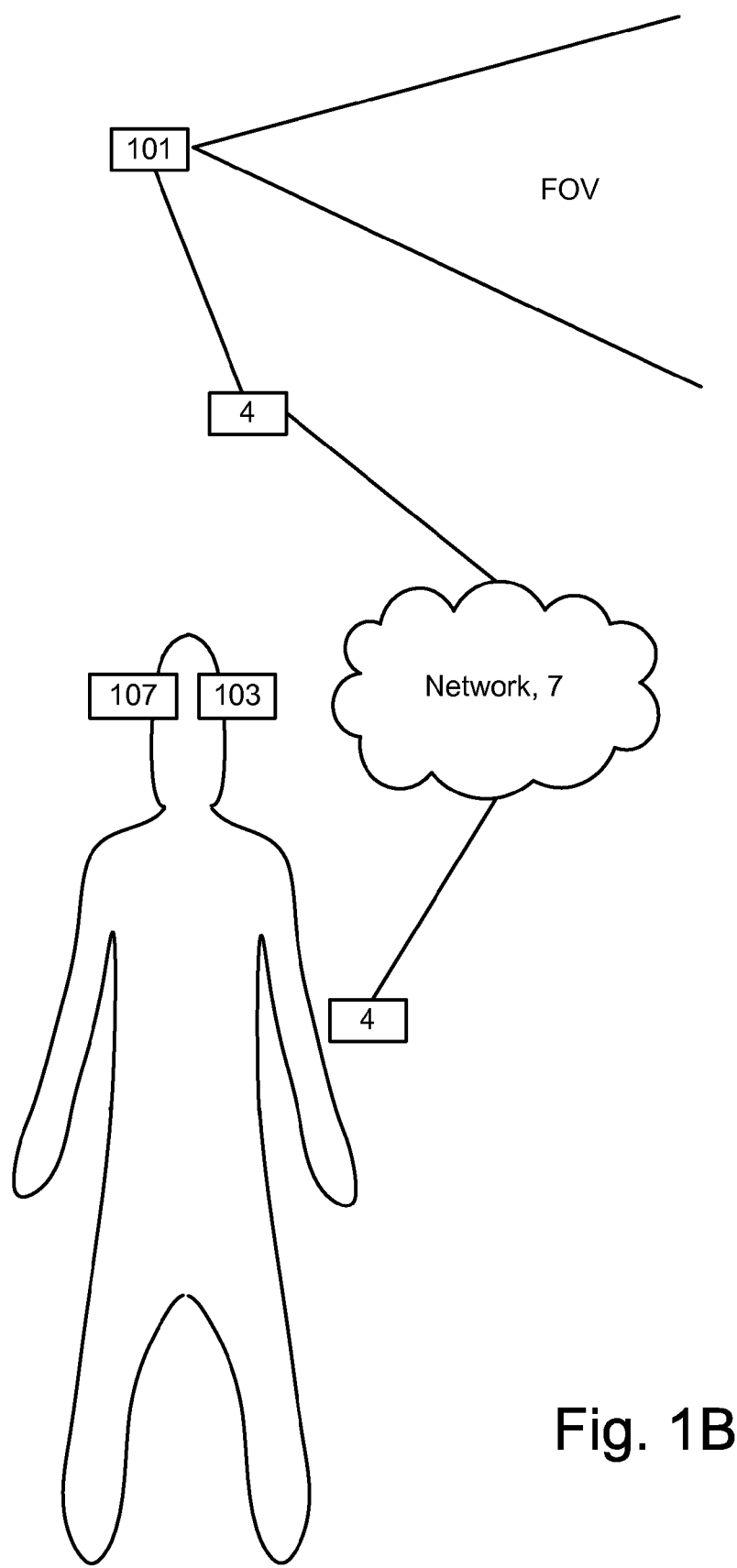

Note that is it not required that the video capture device 101 be carried by a person. FIG. 1B depicts an environment for another embodiment. In this embodiment, the video capture device 101 is not carried by a person. Rather, it may be at some relatively stationary location. Thus, the video capture device 101 is not necessarily a mobile video capture device in this embodiment. In this embodiment, the remote display device 103 may be an HMD that is carried by a person. The carrier of the HMD may optionally carry sensors 107. One example of a sensor 107 is a sensor that is able to track the direction in which the person is looking. Such tracking allows adjustments of what portion of the FOV the person sees. For example, the entire FOV may be difficult to present on the HMD. Therefore, initially some default portion may be presented. If the person's gaze is directed to an object in the lower left of the viewing window 73, then the viewing window 73 may be moved to allow the person to control what portion of the FOV is displayed.

Figure 1C:
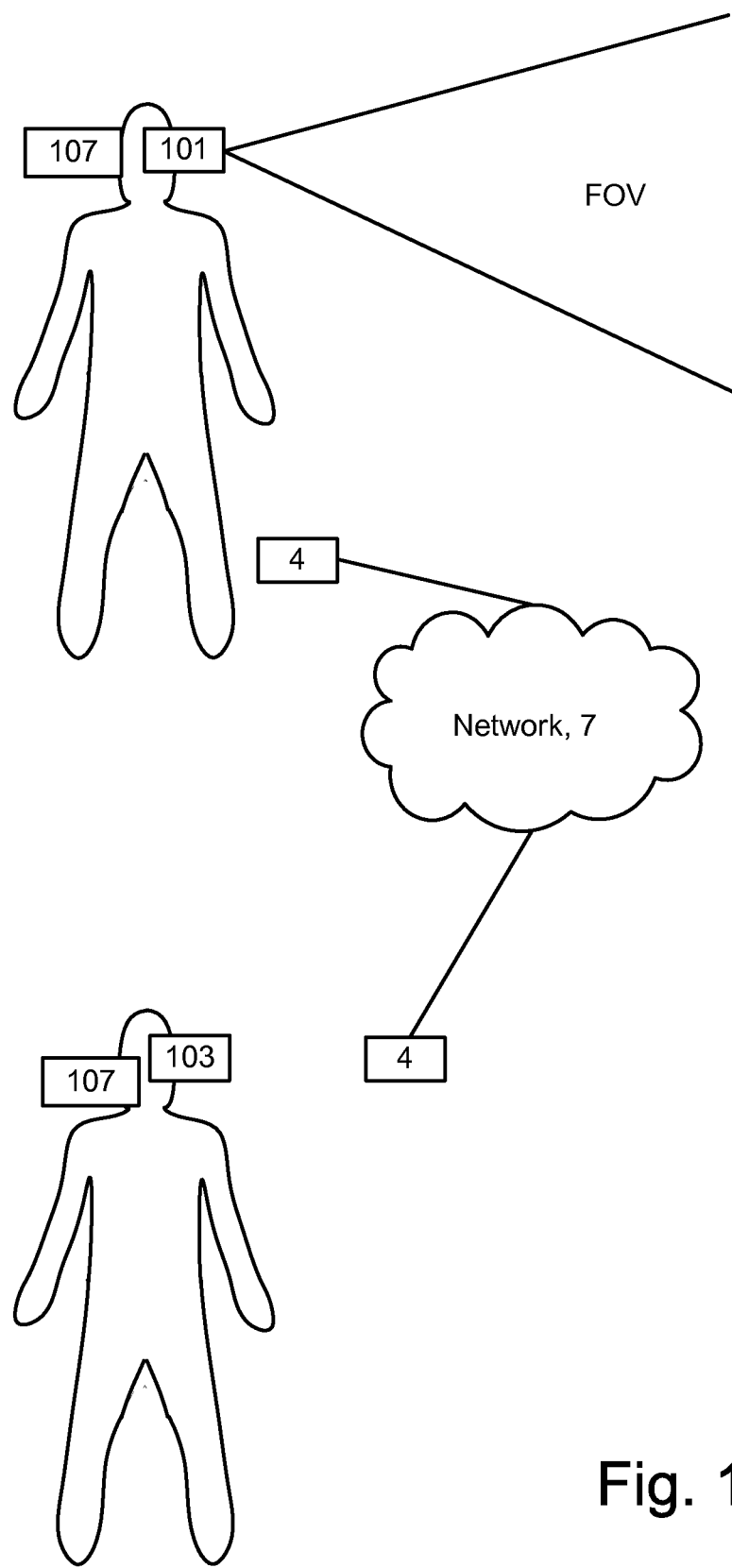

FIG. 1C depicts an environment in which one embodiment may be practiced. In this embodiment, a mobile video capture device 101 is carried by a first person and a mobile remote display device 103 is carried by a second person. Each person may also carry sensors 107, as described in the examples of FIGS. 1A and 1B. The sensors 107 carried by the first person may provide data that allows motion of the first person to be dampened out of the video being presented on the mobile remote video display 103. For example, the viewing window 73 may be moved based on the sensor data to dampen the motion. The sensors 107 may also detect eye position (e.g., gaze) of the first person to allow control over what portion of the FOV is presented on the mobile remote video display 103. The sensors 107 may detect eye position (e.g., gaze) of the second person to allow control over what portion of the FOV is presented on the mobile remote video display 103. The viewing window 73 may be moved based on the eye position to allow control of what gets displayed.

Figure 1D:
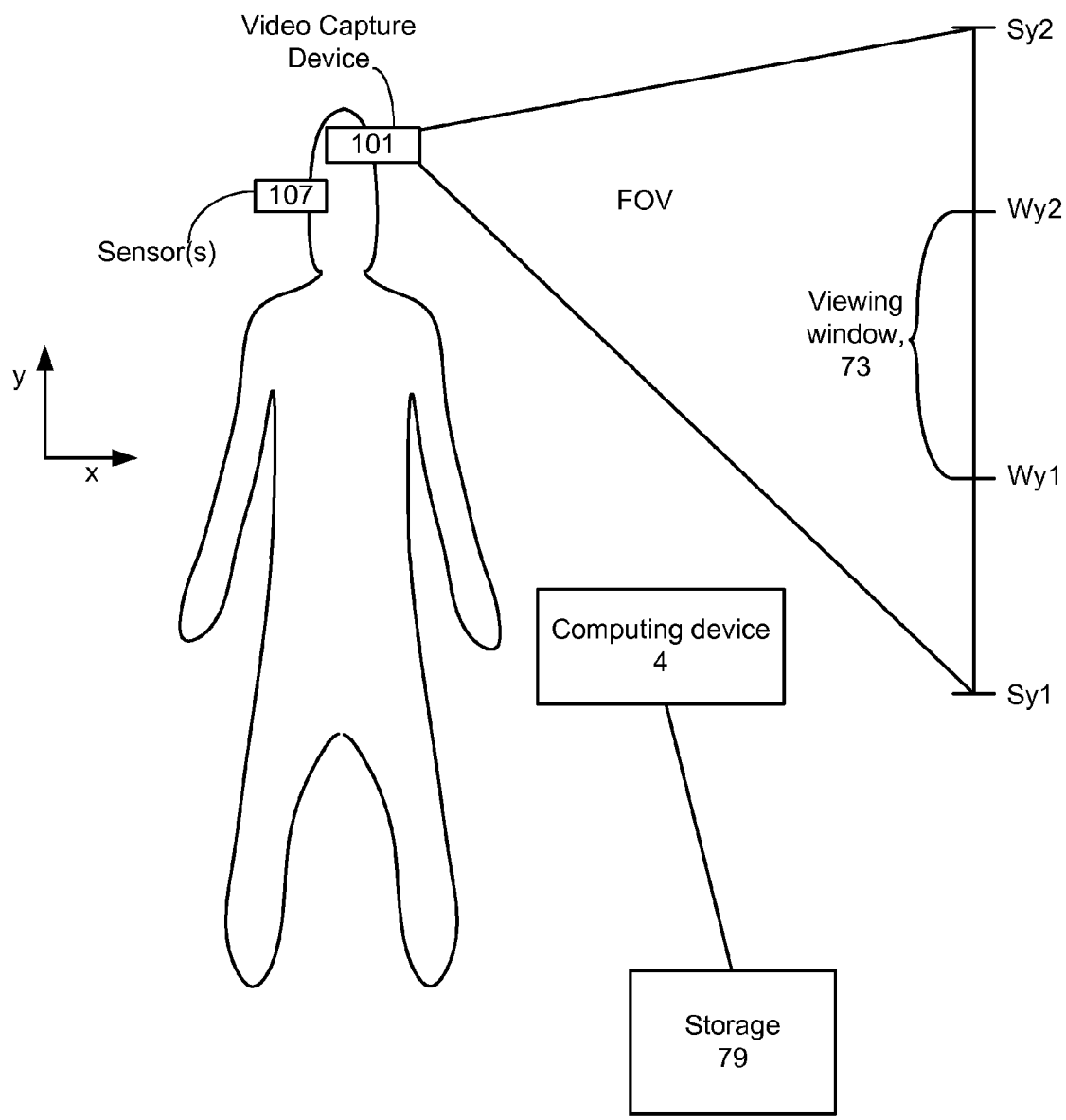

Also note that it is not required that the video stream be transferred over a network. FIG. 1D depicts an environment in which one embodiment may be practiced. In this embodiment, a mobile video capture device 101 is carried by a first person. There is also a storage device 79 for storing either the video stream or the viewing windows 73 or both. The person may also carry sensors 107, as described in other examples. Information from the sensors may be stored in the storage device 79 for later use in creating the viewing windows 73. Alternatively, the sensor information may be used to generate viewing windows 73, which are then stored in storage device 79.

As with other embodiments, the sensors 107 carried by the person may provide data that allows motion of the person to be dampened out of the video. For example, the viewing window 73 may be moved based on the sensor data to dampen the motion. The sensors 107 may also detect eye position (e.g., gaze) of the person that carries the video capture device to allow control over what portion of the FOV is presented on the video display 103.

An example application for the embodiment of FIG. 1D is for a person to capture a video stream with the mobile capture device 101. As noted either the whole video stream or the viewing windows are stored in the storage 79. Later, the person may watch the video on any display device with the motion artifacts automatically removed through the use of the viewing windows 73. Also, the person's eye gaze may be tracked with the sensors 107 such that the viewing windows 73 automatically allow the person to control what portion of the FOV gets displayed.

Note that the viewing window 73 may be used for other purposes, such as to help focus objects on a 3D display. Further details are discussed below.

As noted, a HMD may be used in some embodiments. Following is a discussion of an example HMD that may be used in various embodiments. Note that the HMD may be used to both capture a video stream, as well as to display viewing windows 73. Thus, the HMD is one example of a video capture device 101, as well as one example of a remote display device 103. The HMD may capture and display both 2D video and 3D video.

Figure 3:
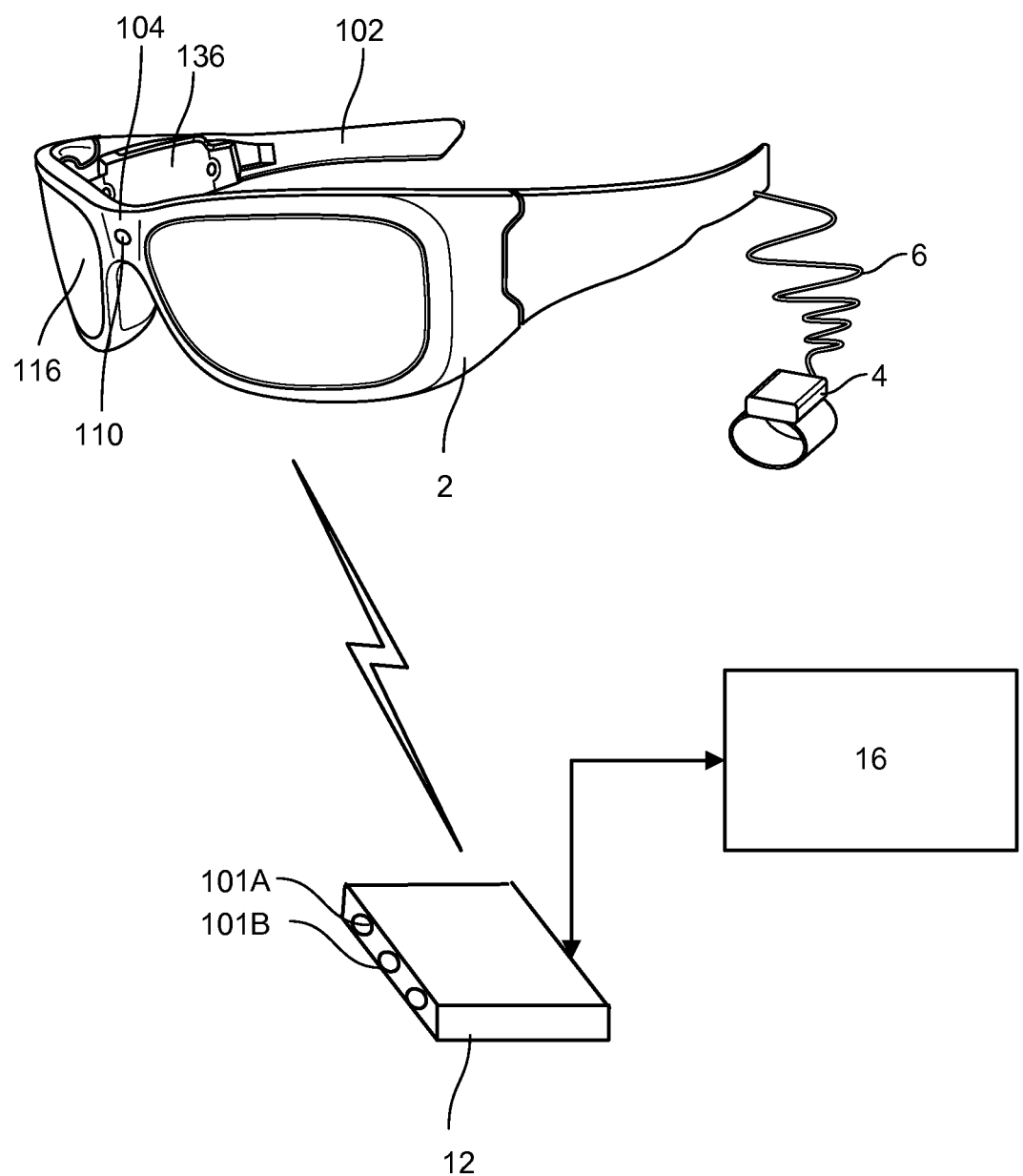
FIG. 3 is a block diagram depicting example components of one embodiment of an HMD device.

FIG. 3 is a block diagram depicting example components of one embodiment of an HMD device. The HMD device 2 is in communication with processing unit 4 via wire 6. In other embodiments, HMD device 2 communicates with processing unit 4 via wireless communication. Head-mounted display device 2, which in one embodiment is in the shape of glasses, including a frame with see-through lenses, is carried on the head of a person so that the person can see through a display and thereby see a real-world scene which includes an image which is not generated by the HMD device. More details of the HMD device 2 are provided below.

In one embodiment, processing unit 4 is carried on the user's wrist and includes much of the computing power used to operate HMD device 2. Processing unit 4 may communicate wirelessly (e.g., using WIFI®, Bluetooth®, infrared (e.g., IrDA or Infrared Data Association standard), or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

As noted in FIG. 1B, it is not required that the video capture device 101 be a mobile video capture device. In one embodiment, the hub computing system 12 has one or more video capture devices 101, such as video capture devices 101A and 101B. In other embodiments, more or fewer than two capture devices 101 can be used. In one example implementation, the video capture devices 101A and 101B are pointed in different directions so that they capture different portions of the room. It may be advantageous that the field of view of the two capture devices slightly overlap so that hub computing system 12 can understand how the fields of view of the capture devices 101 relate to each other. In this manner, multiple capture devices can be used to view an entire room (or other space). Therefore, the video stream may be based on image data captured by one or more video capture devices. Capture devices 101A and 101B may be, for example, cameras that visually monitor one or more users and the surrounding space such that gestures and/or movements performed by the one or more users, as well as the structure of the surrounding space, may be captured, analyzed, and tracked to perform one or more controls or actions.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers.

Hub computing device 10, with capture devices 101A and 101B, may be used to recognize, analyze, and/or track human (and other types of) targets. For example, a person wearing HMD device 2 may be tracked using the capture devices 101A and 101B such that the gestures and/or movements of the person may be captured. These gestures may be used to trigger various modes, such as a mode in which eye position is used to move the viewing window 73.

A user display apparatus may be provided, e.g., by the HMD device 2 and optionally, the hub computing system 12 or other components. The display apparatus may serve as the remote video display 103.

Figure 4:
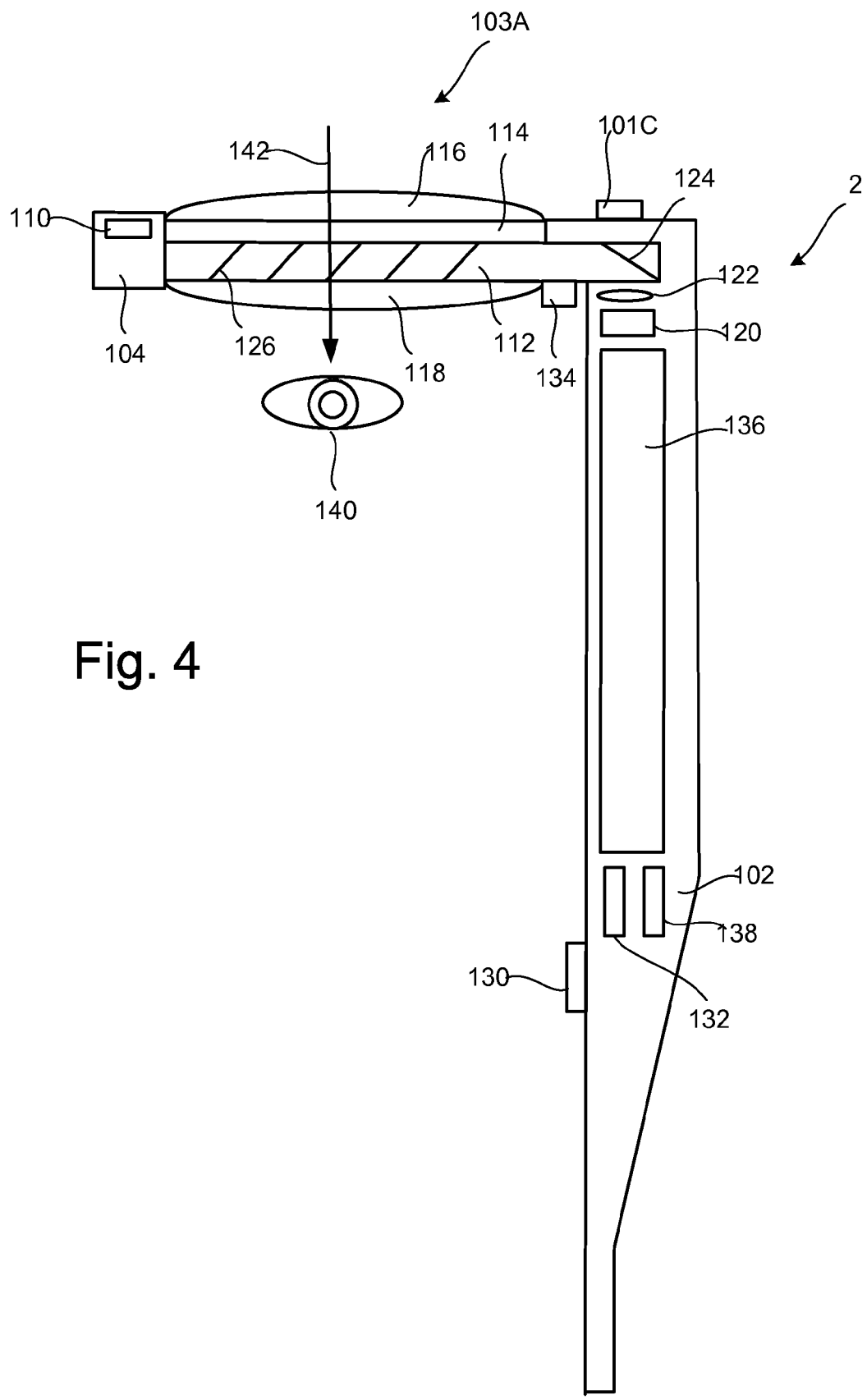
FIG. 4 is a top view of a portion of one embodiment of a HMD device.

FIG. 4 depicts a top view of a portion of HMD device 2, including a portion of the frame that includes temple 102 and nose bridge 104. Only the right side of HMD device 2 is depicted. Built into nose bridge 104 is a microphone 110 for recording sounds and transmitting that audio data to processing unit 4, as described below. At the front of HMD device 2 is room-facing video camera 101C that can capture video and still images. A room-facing depth camera could also be provided. Those images are transmitted to processing unit 4, as described below. The room-facing video camera 101C faces outward and has a viewpoint similar to that of the user. The video camera 101C is one example of a mobile video capture device 101.

In some embodiments, the video camera 101C serves as part of a 3D video capture device. Note that the 3D video capture device could include a combination of a depth camera and an RGB camera, two RGB cameras, or even a combination of a depth camera and two RGB cameras. In one embodiment, two RGB cameras employ stereo vision to capture the data for the 3D video stream. In one embodiment, the depth camera is used to determine a depth map, which describes a depth (or distance) to each object. The data from a single RGB camera may be combined with the depth map to generate the 3D video stream. Processing of the image data captured by the video camera 101C to generate the 3D video stream may be performed by any computing device, such as, the hub computing system 12.

A portion of the frame of HMD device 2 will surround a display 103A (that includes one or more lenses). In order to show the components of HMD device 2, a portion of the frame surrounding the display is not depicted. The display 103A includes a light guide optical element 112, opacity filter 114, see-through lens 116 and see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of opacity filter 114 and light guide optical element 112 are provided below.

Mounted to or inside temple 102 is an image source, which (in one embodiment) includes microdisplay 120 for projecting a virtual image and lens 122 for directing images from microdisplay 120 into light guide optical element 112. In one embodiment, lens 122 is a collimating lens. A remote display device can include microdisplay 120, one or more optical components such as the lens 122 and light guide 112, and associated electronics such as a driver. Such a remote display device is associated with the HMD device, and emits light to a user's eye, where the light represents the viewing window 73.

Control circuits 136 provide various electronics that support the other components of HMD device 2. More details of control circuits 136 are provided below with respect to FIG. 5. Inside, or mounted to temple 102, are ear phones 130, inertial sensors 132 and temperature sensor 138. In one embodiment, inertial sensors 132 include a three axis magnetometer 132A, three axis gyro 132B and three axis accelerometer 132C (See FIG. 5). The inertial sensors are for sensing position, orientation, sudden accelerations of HMD device 2. For example, the inertial sensors can be one or more sensors which are used to determine an orientation and/or location of user's head. This may be used to determine how to move the viewing window 73 to dampen motion.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and MIRASOL® (a display technology from QUALCOMM, INC.) are all examples of reflective technologies which are efficient as most energy is reflected away from the modulated structure. Additionally, microdisplay 120 can be implemented using an emissive technology where light is generated by the display. For example, a PicoP™-display engine (available from MICROVISION, INC.) emits a laser signal with a micro mirror steering either onto a tiny screen that acts as a transmissive element or beamed directly into the eye (e.g., laser).

Light guide optical element 112 transmits light from microdisplay 120 to the eye 140 of the person wearing HMD device 2. Light guide optical element 112 also allows light from in front of the HMD device 2 to be transmitted through light guide optical element 112 to eye 140, as depicted by arrow 142, thereby allowing the person to have an actual direct view of the space in front of HMD device 2 in addition to receiving a virtual image from microdisplay 120. Thus, the walls of light guide optical element 112 are see-through. Light guide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing.

Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in U.S. Patent Application Publication 2008/0285140, Ser. No. 12/214,366, published on Nov. 20, 2008, incorporated herein by reference in its entirety. In one embodiment, each eye will have its own light guide optical element 112. When the HMD device has two light guide optical elements, each eye can have its own microdisplay 120 that can display the same image in both eyes or different images in the two eyes. In another embodiment, there can be one light guide optical element which reflects light into both eyes. In some embodiments, a 3D video signal is presented to the person by presenting two related but different images. For example, if two RGB cameras were used to generate the 3D signal, then the signal from one RGB camera may be fed into the right eye and the signal from the other RGB camera may be fed into the left eye. However, note that in some embodiments, only the viewing window 73 is fed into the eye. Thus, there may be a left viewing window 73 and a right viewing window 73. Note that the signal that is fed into each eye does not necessarily correspond to one that was captured by an RGB camera. For example, a depth camera and a single RGB camera have been used to capture image data for the 3D video signal.

In some embodiments, the HMD has an opacity filter 114. Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below. The opacity filter 114 may be set to whatever transmissivity is desired when presenting the viewing windows 73.

Figure 5:
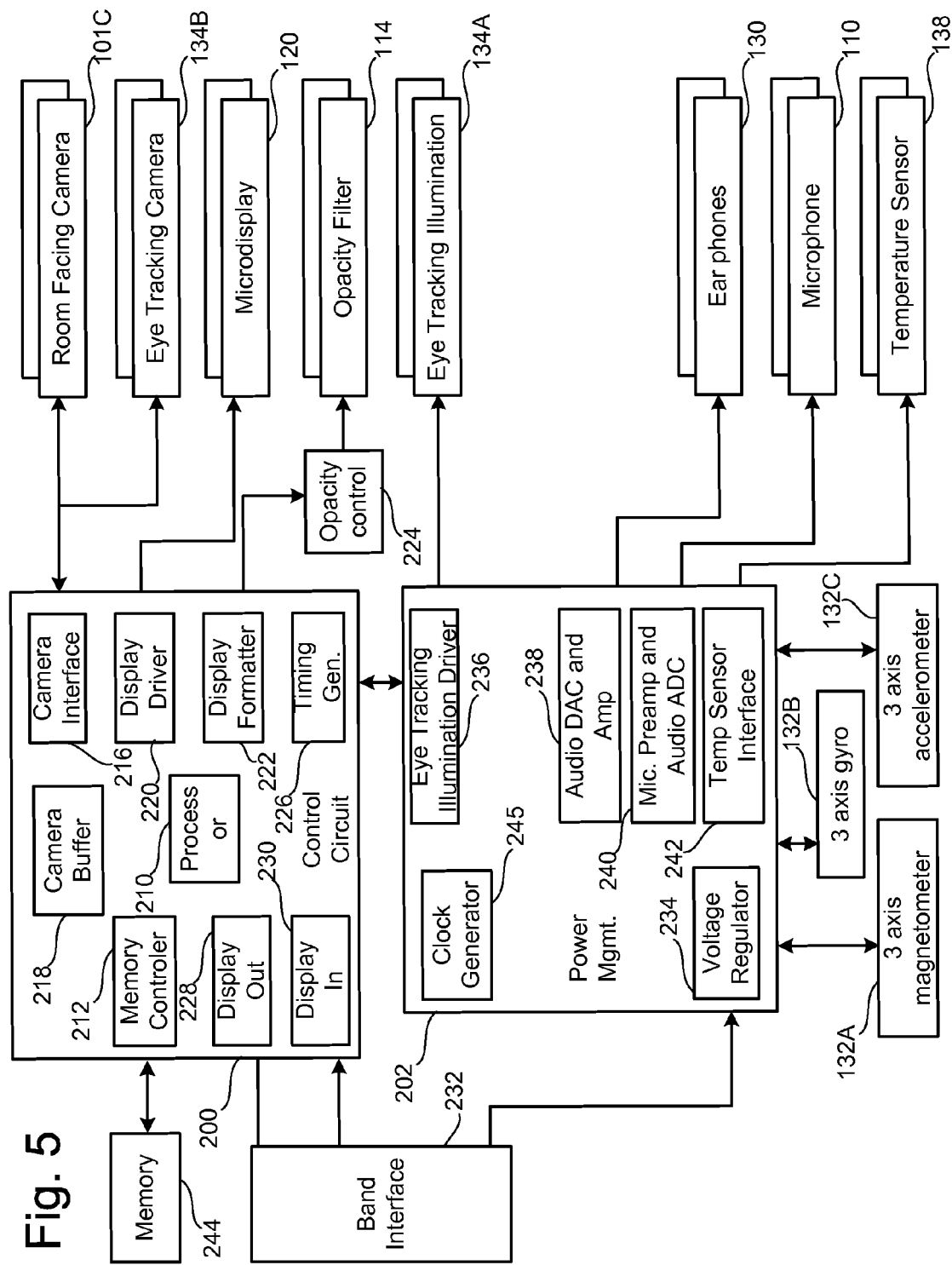
FIG. 5 is a block diagram of one embodiment of the components of a HMD device.
Figure 6:
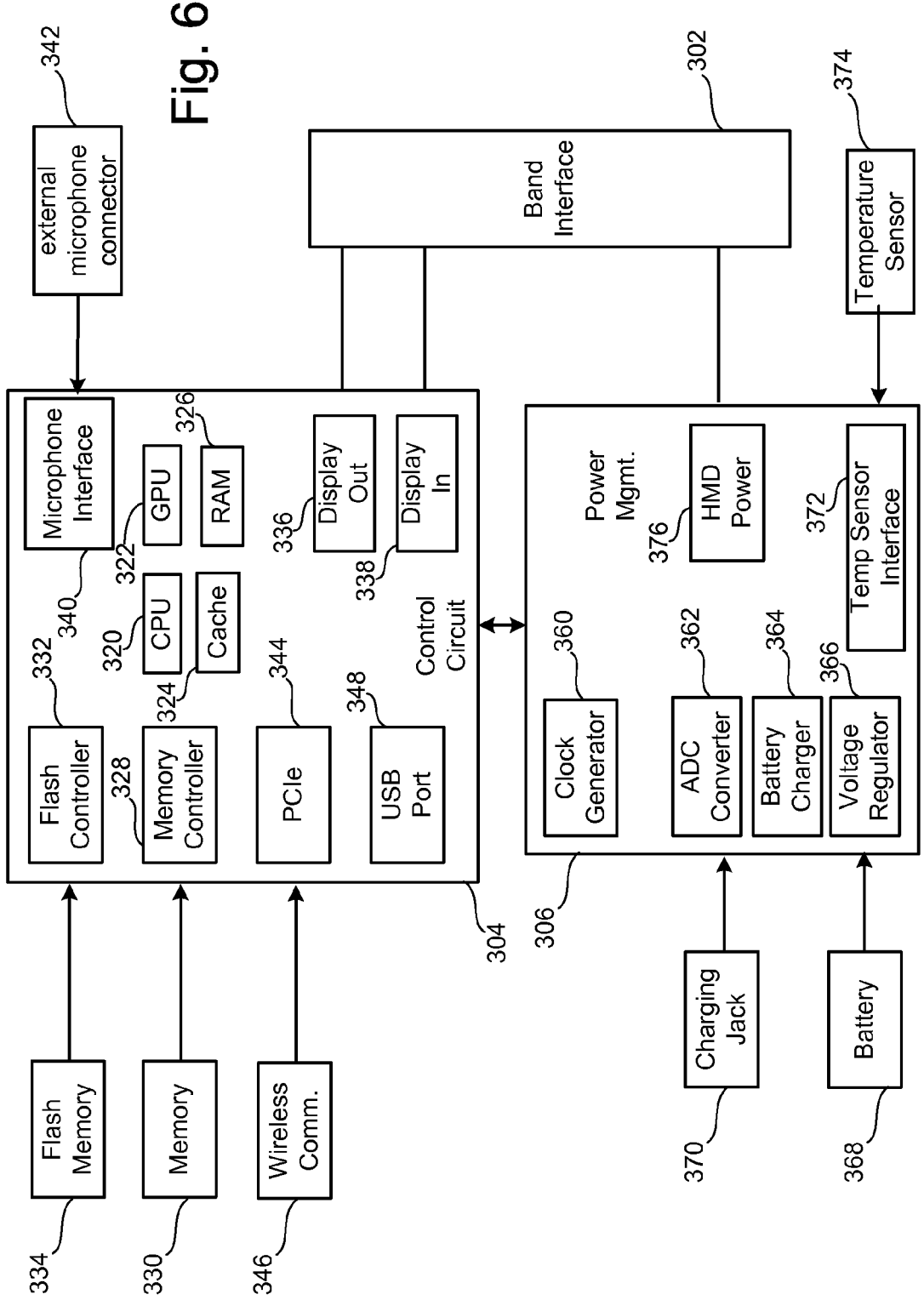
FIG. 6 is a block diagram of one embodiment of the components of a processing unit associated with a HMD device.

FIG. 5 is a block diagram depicting the various components of HMD device 2. FIG. 6 is a block diagram describing the various components of processing unit 4. Additionally, the HMD device components of FIG. 5 include many sensors that track various conditions. Head-mounted display device may receive a viewing window portion of a video stream from processing unit 4 and may provide sensor information back to processing unit 4. Processing unit 4, the components of which are depicted in FIG. 5, may receive the sensory information from HMD device 2 and also from hub computing device 12 (See FIG. 3). Based on that information, processing unit 4 may determine where to place the viewing window 73 in the video stream. Note that another computing device can determine where to place the viewing window 73.

Note that some of the components of FIG. 5 (e.g., room facing camera 101C, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of HMD device. Regarding the room-facing camera 101C, in one approach one camera is used to obtain images using visible light. These images can be used to identify the location of a video display screen in a room using machine vision techniques. In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12 (see also capture device 101A of FIG. 3).

FIG. 5 shows the control circuit 200 in communication with the power management circuit 202. Control circuit 200 includes processor 210, memory controller 212 in communication with memory 244 (e.g., DRAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 112 and stores images received from the room facing cameras in camera buffer 218. Display driver 220 drives microdisplay 120. Display formatter 222 provides information, about the viewing window 73 being displayed on microdisplay 120, to opacity control circuit 224, which controls opacity filter 114. Timing generator 226 is used to provide timing data for the system. Display out interface 228 is a buffer for providing images from room facing cameras 112 to the processing unit 4. Display in 230 is a buffer for receiving images such as a viewing window 73 to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 245. Voltage regulator 234 receives power from processing unit 4 via band interface 232 and provides that power to the other components of HMD device 2. Eye tracking illumination driver 236 provides the infrared (IR) light source for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three-axis magnetometer 132A, three-axis gyroscope 132B and three axis accelerometer 132C.

FIG. 6 is a block diagram describing the various components of processing unit 4. Control circuit 304 is in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of nonvolatile storage), display out buffer 336 in communication with HMD device 2 via band interface 302 and band interface 232, display in buffer 338 in communication with HMD device 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication component 346 can include a WIFI® enabled communication device, Bluetooth communication device, infrared communication device, etc. The wireless communication component 346 is a wireless communication interface which, in one implementation, receives data in synchronism with the content displayed by the video display screen 16. Further, viewing windows 73 may be displayed in response to the received data.

The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to place viewing windows 73 in the video stream.

Power management circuit 306 includes clock generator 360, analog to digital converter 362, battery charger 364, voltage regulator 366, HMD power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the HMD device 2.

The above-described system can be configured to determine where to place viewing windows 73 in the video stream. In one embodiment, HMD device 12, processing unit 4 and hub computing device 12 work together as each of the devices includes a subset of sensors that are used to obtain the data for determining where, when and how to move the viewing window 73 in the video stream. In one embodiment, the calculations that determine where, how and when to move the viewing window 73 in the video stream are performed by the hub computing device 12. In another embodiment, those calculations are performed by processing unit 4. In another embodiment some of the calculations are performed by hub computing device 12 while other calculations are performed by processing unit 4. In other embodiments, the calculations can be performed by HMD device 12.

Figure 7:
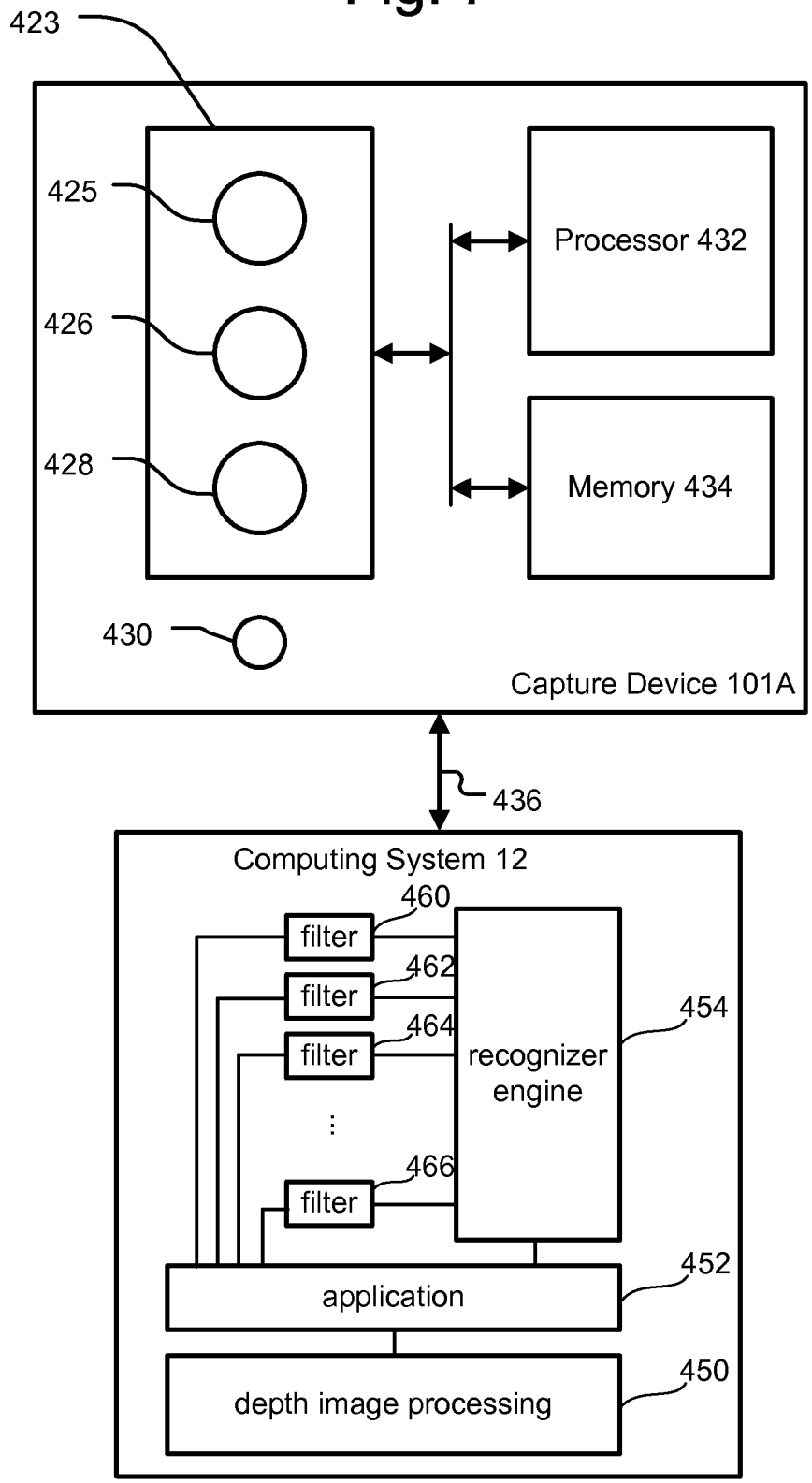
FIG. 7 is a block diagram of one embodiment of the components of a hub computing system used with a HMD device.

FIG. 7 illustrates an example embodiment of hub computing system 12 with a video capture device. In one embodiment, capture devices 101A and 101B are the same structure, therefore, FIG. 7 only shows capture device 101A. Note that the video capture device 101A is static (e.g., not mobile) in this embodiment.

According to an example embodiment, video capture device 101A may be configured to capture video with depth information including a depth image that may include depth values via any suitable technique including, for example, time-of-flight, structured light, stereo image, or the like. According to one embodiment, the video capture device 101A may organize the depth information into "Z layers," or layers that may be perpendicular to a Z axis extending from the depth camera along its line of sight.

Video capture device 101A may include a camera component 423, which may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infrared (IR) light component 425, an infrared camera 426, and an RGB (visual image) camera 428 that may be used to capture the depth image of a scene. A 3-D camera is formed by the combination of the infrared emitter 24 and the infrared camera 26. For example, in time-of-flight analysis, the IR light component 425 of the capture device 101A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 101A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 101A to a particular location on the targets or objects by analyzing the intensity of the reflected beam of light over time via various techniques including, for example, shuttered light pulse imaging.

In another example embodiment, video capture device 101A may use a structured light to capture depth information. In such an analysis, patterned light (i.e., light displayed as a known pattern such as grid pattern, a stripe pattern, or different pattern) may be projected onto the scene via, for example, the IR light component 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 425 and 426 so triangulation can be used to determined distance from cameras 425 and 426. In some implementations, the capture device 101A will include a dedicated IR sensor to sense the IR light, or a sensor with an IR filter.

According to another embodiment, the capture device 101A may include two or more physically separated cameras that may view a scene from different angles to obtain visual stereo data that may be resolved to generate depth information. Other types of depth image sensors can also be used to create a depth image.

The video capture device 101A may further include a microphone 430, which includes a transducer or sensor that may receive and convert sound into an electrical signal. Microphone 430 may be used to receive audio signals that may also be provided by hub computing system 12.

In an example embodiment, the video capture device 101A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Video capture device 101A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 7, in one embodiment, memory 434 may be a separate component in communication with the image capture component 423 and processor 432. According to another embodiment, the memory 434 may be integrated into processor 432 and/or the image capture component 423.

Video capture device 101A is in communication with hub computing system 12 via a communication link 436. The communication link 436 may be a wired connection including, for example, a USB connection, a FireWire connection, an Ethernet cable connection, or the like and/or a wireless connection such as a wireless 802.11b, g, a, or n connection. According to one embodiment, hub computing system 12 may provide a clock to capture device 101A that may be used to determine when to capture, for example, a scene via the communication link 436. Additionally, the video capture device 101A provides the depth information and visual (e.g., RGB or other color) images captured by, for example, the 3-D camera 426 and/or the RGB camera 428 to hub computing system 12 via the communication link 436. In one embodiment, the depth images and visual images are transmitted at 30 frames per second; however, other frame rates can be used.

Hub computing system 12 includes depth image processing module 450. Depth image processing may be used to determine depth to various objects in the FOV. In some embodiments, this is used to help bring objects into sharp focus.

Recognizer engine 454 is associated with a collection of filters 460, 462, 464, . . . , 466 each comprising information concerning a gesture, action or condition that may be performed by any person or object detectable by capture device 101A or 101B. For example, the data from capture device 101A may be processed by filters 460, 462, 464, . . . , 466 to identify when a user or group of users has performed one or more gestures or other actions. Those gestures may be associated with various controls. For example, a user might trigger or control how the viewing window 73 is moved using gestures.

Capture device 101A provides RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system may track a skeleton of a person using the depth images. There are many methods that can be used to track the skeleton of a person using depth images.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. 2010/0194762, "Standard Gestures," published Aug. 5, 2010, and U.S. patent application Ser. No. 12/474,655, "Gesture Tool" filed on May 29, 2009, both of which are incorporated herein by reference in their entirety.

Figure 8:
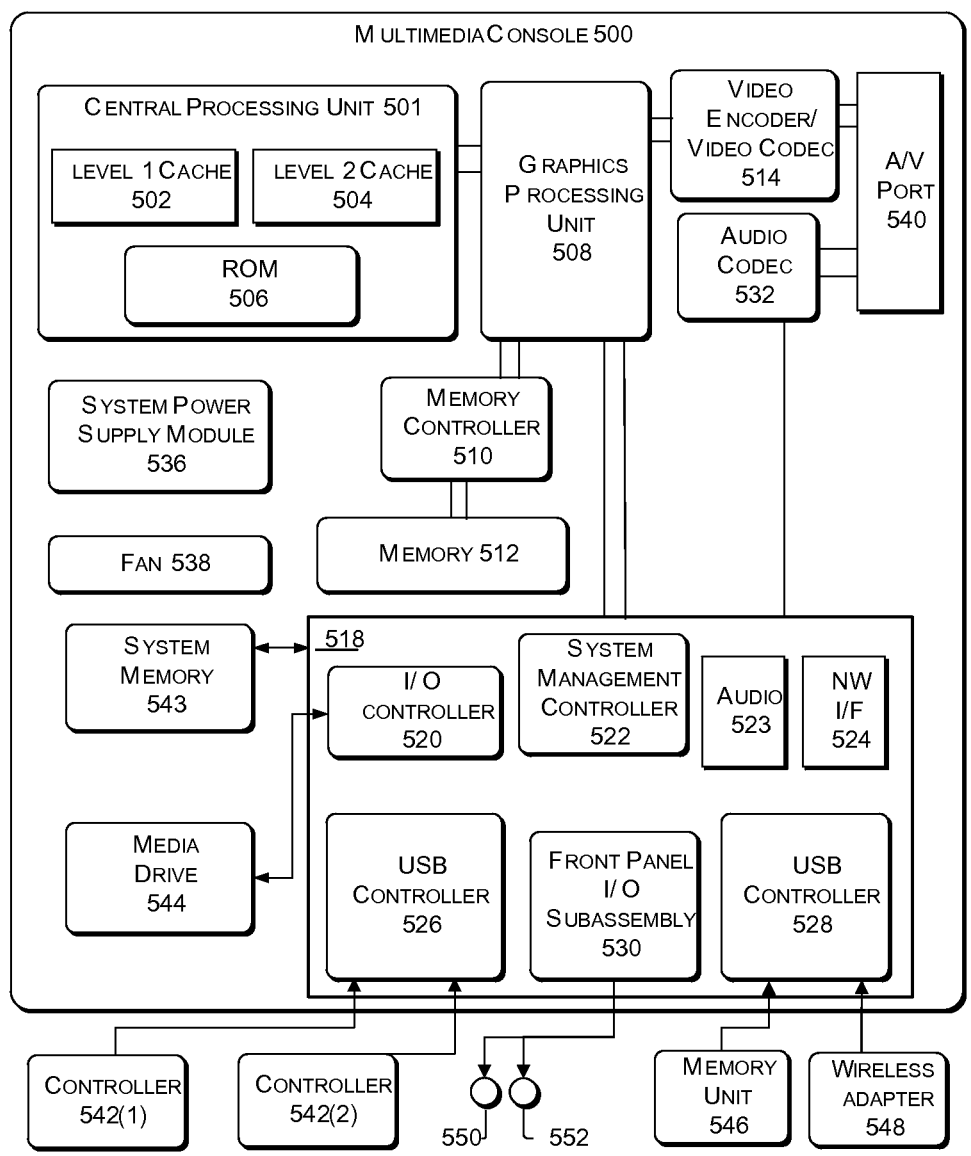
FIG. 8 is a block diagram of one embodiment of a computing system that can be used to implement the hub computing system described herein.

FIG. 8 illustrates an example embodiment of a computing system that may be used to implement hub computing system 12. As shown in FIG. 8, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394 serial bus interface).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. Such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render a popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 101A and 101B may define additional input devices for the console 500 via USB controller 526 or other interface. In other embodiments, hub computing system 12 can be implemented using other hardware architectures. No one hardware architecture is required.

FIG. 3, discussed previously, depicts one HMD device 2 and processing unit 4 (collectively referred to as a mobile display device) in communication with one hub computing device 12 (referred to as a hub). In another embodiment, multiple mobile display devices can be in communication with a single hub. Each of the mobile display devices will communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

Figure 9:
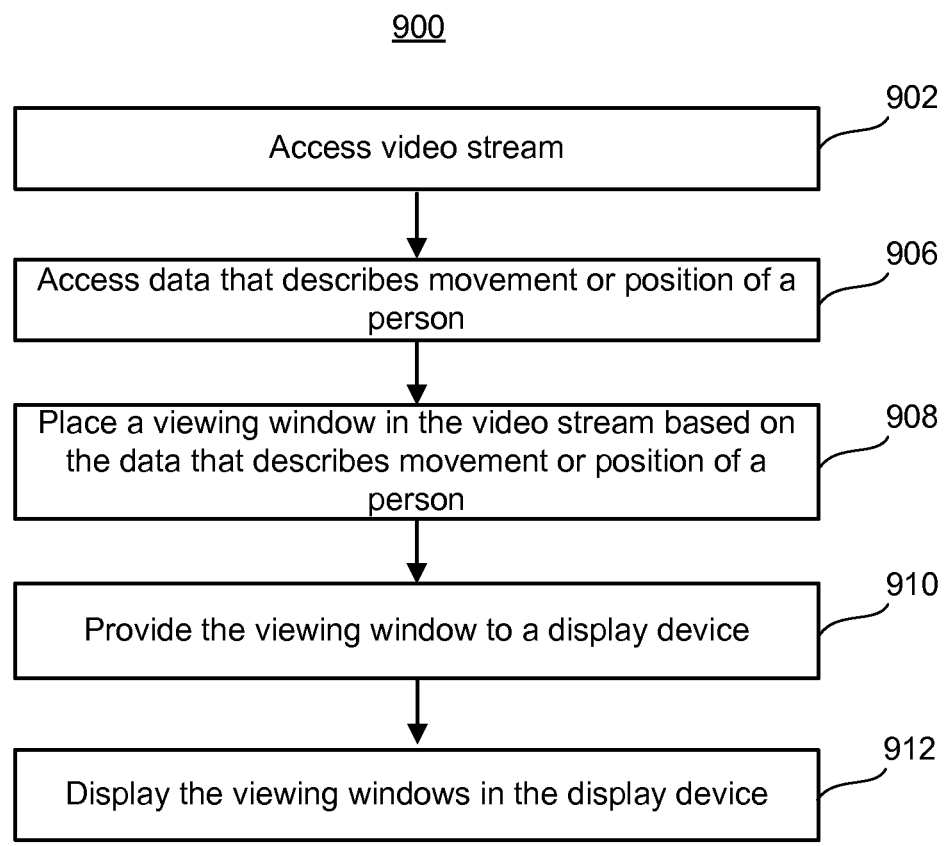
FIG. 9 is a flowchart describing one embodiment of a process for displaying a video signal.

FIG. 9 is a flowchart describing one embodiment of a process 900 for displaying a video signal. The process could be performed in an environment such as those examples in FIGS. 1A-1D, or another environment. Note that various steps of process 900 could be performed by different devices in the environment. Also note that the steps are described in a particular order as a matter of convenience. It will be understood that a different order could be used.

Step 902 is accessing a video stream. The video stream may be accessed using a video capture device 101 that is carried by a person; however, the video capture device 101 does not need to be carried by a person. The video stream may be a 3D video stream or a 2D video stream. A 3D video stream may include two separate streams, for example, a right stream and a left stream.

Step 906 is accessing data that describes movement or a position of a person. Note that this includes movement or position of a body part of the person, such as eye position (e.g., direction of eye gaze). In one embodiment, the movement data describes motion of the person carrying the video capture device 101. One example of such data is referred here as Inertial Measurement Unit (IMU) data, although other data might be used. In one embodiment, the data describes motion or position of the eye of the carrier of the remote video capture device 101. In one embodiment, the data describes motion or position of the eye of the carrier of the remote display device 103. The data may be used to determine a direction of an "eye gaze" (e.g., a direction that the person is looking). One example of being able to track eye motion using an HMD has been described herein, although step 906 is not limited to this technique.

Step 908 is placing a viewing window 73 in the video stream based on the data that describes movement or position of a user. In some embodiments, the video stream includes a series of video frames. The viewing window 73 may be some spatial subset of each video frame. Thus, by placing the viewing window 73 in the video stream means to place the viewing window 73 in a particular place in each video frame such that the viewing window 73. In some embodiments, the viewing window 73 is moved in the video stream. Moving the viewing window 73 means to place the video window 73 in a different spatial position of the full video screen. For example, FIGS. 2A and 2B may contain two different video frames of the full screen video 119. The viewing window 73 is in a different spatial position in the two full screen video frames 119. Thus, the viewing window 73 is being moved in the video stream.

Note that in some embodiments, the video stream may have a left stream and a right stream. Thus, step 908 may include placing a right viewing window 73 and a left viewing window 73 in respective video streams. In some embodiments, the right viewing window 73 is moved relative to the left viewing window 73 in order to focus one or more objects in a scene. Note that the step of moving the viewing window 73 may be performed on any processing device. For example, this step might be performed prior to or after transmitting step 904.

Step 910 is providing the viewing window 73 to a display device 103. In one embodiment, at least a portion of the video stream is transmitted from the video capture device 101 to a remote display device 103. Step 910 may include transmitting the full video screens 119 or just the viewing windows 73. Note that at least a portion of the video stream means that at least some subset of each video frame is transmitted. Thus, this may be termed some "spatial portion" of the video stream, as opposed to a "temporal portion" of the video stream.

The video stream may be transmitted over a network 7. This may be a local area network (LAN), wide area network (WAN), etc. In one embodiment, the video stream is transmitted over the Internet. In one embodiment, the video stream is transmitted over a cellular telephone network. The video stream may be transmitted over any combination of these or other networks. In one embodiment, the video stream is transmitted from a video capture device 101 that is being carried by a first person to a remote display device 103 that is being carried by a second person. In one embodiment, the video stream is transmitted from a video capture device 101 that is being carried by a first person to a remote display device 103 such as a cellular telephone, a laptop computer, a notebook computer, a desktop computer, etc. In one embodiment, the video stream is transmitted from a video capture device 101 that is stationary to a remote display device 103 that is being carried by a user. Therefore, it is not required that the video capture device 101 is carried by a user.

Note that it is not required that the video stream or viewing windows 73 be transferred over a network 7. For example, in one embodiment video stream or windows are stored locally (see, for example, FIG. 1D).

The display device 103 may then display the viewing windows 73 in step 912. In some embodiments, the display device is a remote display device. Note that the entire video stream is not displayed. For example, the full screen video 119 is not displayed. Rather, only the viewing window 73 and not remaining portions of the video stream are displayed. Thus, only a portion of the video stream that contains the viewing window 73 is displayed, in one embodiment. In one embodiment, the viewing window 73 is displayed on an HMD.

Figure 16:
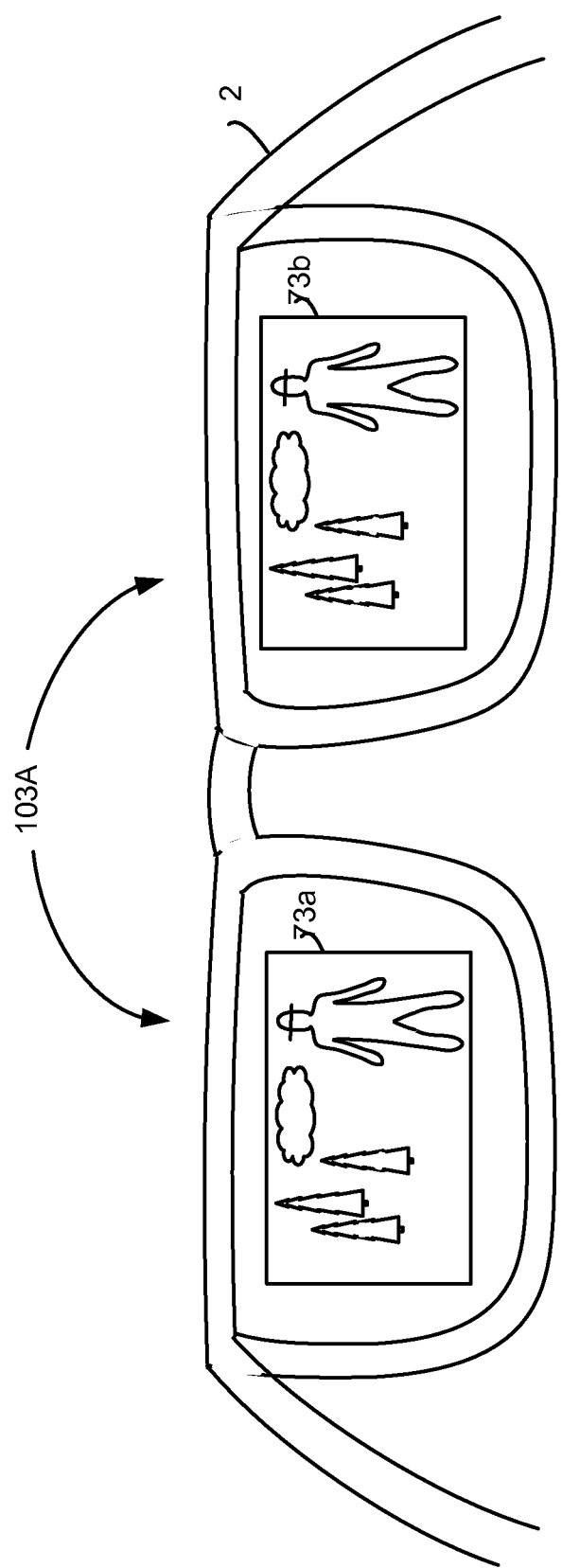
FIG. 16 depicts one embodiment of a left viewing window and a right viewing window being presented on an HMD.

The video stream may be 2D or 3D. If the video stream is 2D, then there may be one viewing window 73 for each frame of video data. In the video stream is 3D, then there may be a right and a left video stream. In this 3D case, there may be a right viewing window 73 and a left viewing window. As one example, the remote display device 103 may present one viewing window 73 to each eye of the user. Note that the viewing windows 73 could be presented on a device that has a single display screen (e.g., cellular telephone, laptop, etc.). In this case, the person might wear special glasses to allow them to see the 3D video stream in 3D. However, it is not required that the video stream be presented in 3D. In one embodiment, the video stream is presented in 2D on the remote display device. FIG. 16 depicts one example of a left viewing window 73a and a right viewing window 73b being presented on an HMD 2, which serves as a remote display 103A.

Figure 10A:
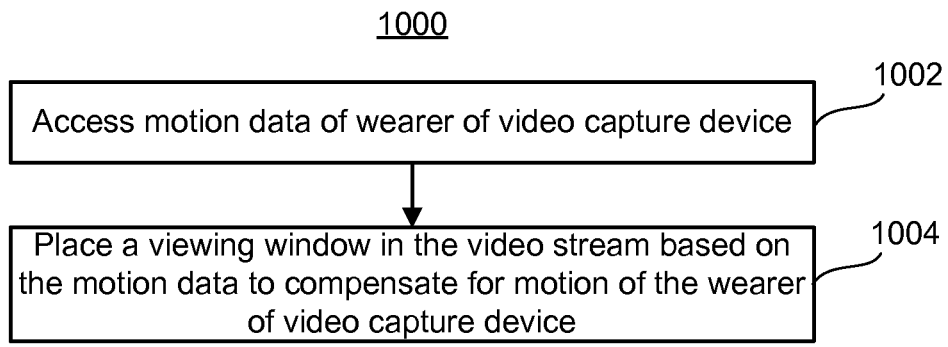
FIG. 10A is a flowchart describing one embodiment of a process for placing a viewing window in response to data pertaining to movement of a person.

In one embodiment, the viewing window 73 is moved in the video stream to compensate for motion of the carrier of the video capture device 101. For example, this may provide for dampening of motion artifacts. FIG. 10A is a flowchart describing one embodiment of a process 1000 for placing a viewing window 73 in response to data pertaining to movement of a person. Process 1000 is one embodiment of steps 906 and 908 of process 900 of FIG. 9. Note that the general flow of FIG. 10A may be performed repeatedly to place other viewing windows 73 into the video stream.

In step 1002, motion data pertaining to the carrier of the video capture device 101 is accessed. One type of motion data may be collected from devices that are sometimes referred to as Inertial Measurement Units (IMUs). Examples include, but are not limited to, accelerometers and gyroscopes. The data for step 1002 is not limited to data from IMUs. Further details of one embodiment of accessing motion data is described with respect to FIG. 11.

Figure 13:
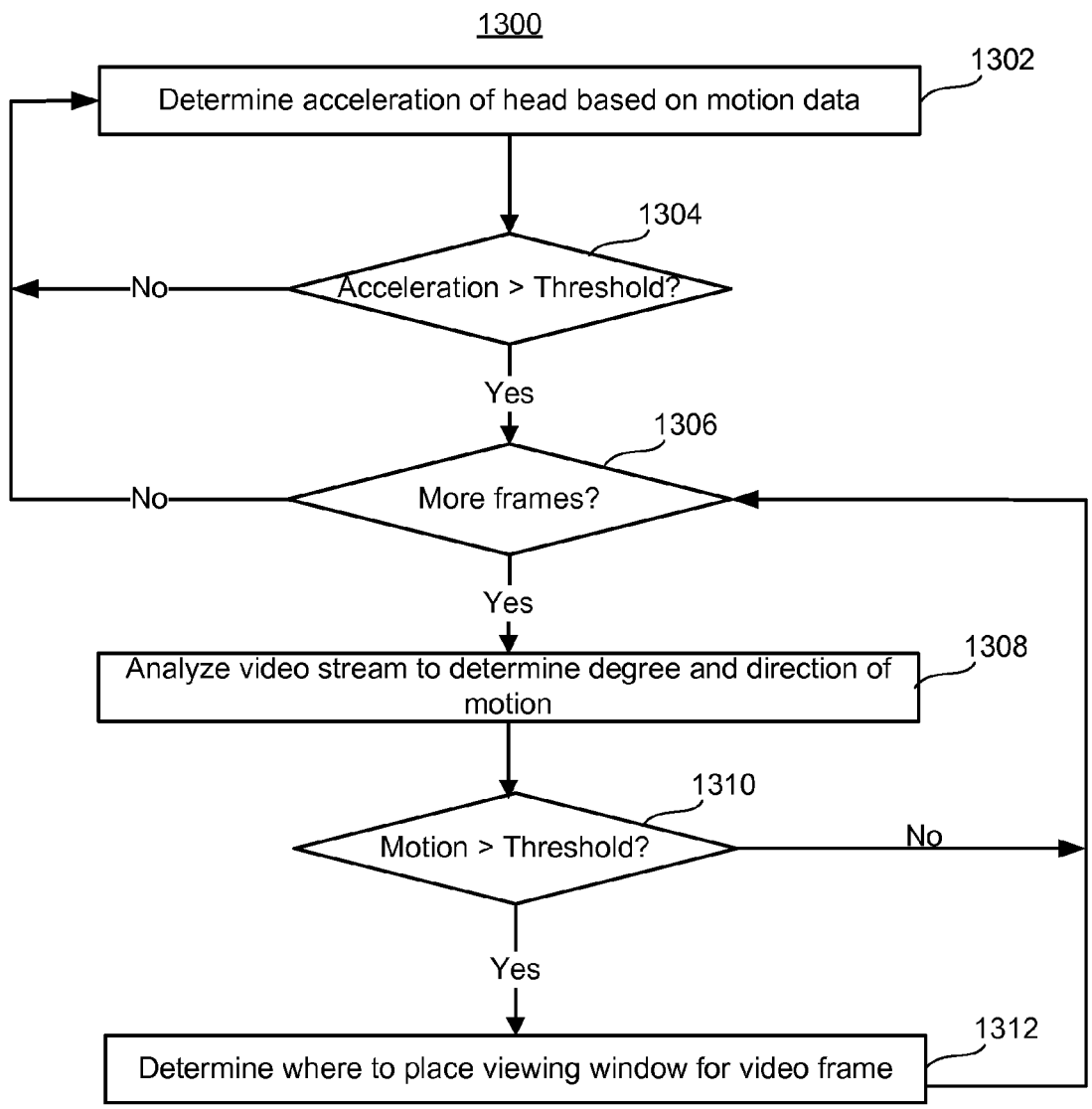
FIG. 13 is a flowchart of one embodiment of a process of determining where to place a viewing window in each frame of the video stream.

In step 1004, the motion data is used to place the viewing window 73 in the video stream. This may compensate for motion of the carrier of the video capture device. Referring back to FIGS. 2A-2C, the viewing window 73 may be moved over time (relative to the full screen) in order to dampen motion of the video capture device 101 caused by motion of the user. Hence, motion of the full screen video 119 may be dampened. FIG. 13, discussed below, provides details of one embodiment of step 1004.

In one embodiment, the viewing window 73 is placed or moved in the video stream to allow for the carrier of the video capture device 101 to control what portion of the FOV is presented in the remote display device 103. For example, referring back to FIG. 2A, the person might look at the house to cause the viewing window 73 to be moved to that area. As another example, the person might focus their attention on the person in the viewing window 73 shown in FIG. 2A to "zoom in" to that region.

Figure 10B:
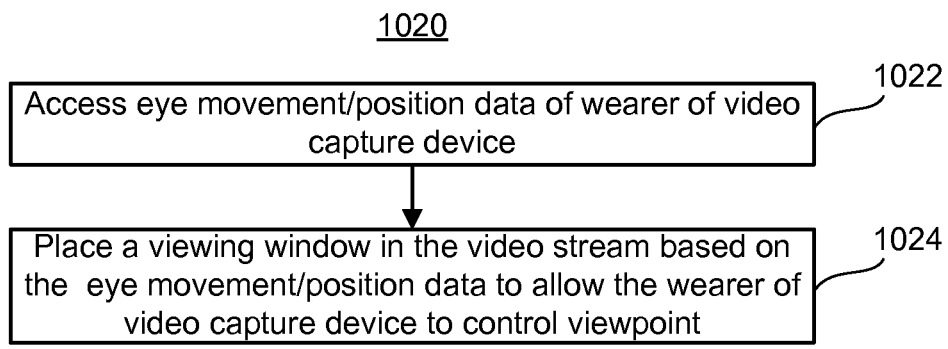
FIG. 10B is a flowchart describing one embodiment of a process for moving a viewing window to allow a carrier of the video capture device to control the viewing window.

FIG. 10B is a flowchart describing one embodiment of a process 1020 for moving a viewing window 73 to allow a carrier of the video capture device 101 to control the viewing window 73. Process 1020 is one embodiment of steps 906 and 908 of process 900 of FIG. 9. Note that the general flow of FIG. 10B may be performed repeatedly to place other viewing windows 73 into the video stream.

Note that process 1020 may be performed instead of process 1000, or in addition to process 1000. For example, if the carrier of the video capture device 101 is walking, it may be desirable to both dampen out motion artifacts using process 1000, as well as allow the carrier to control the viewing window 73. However, dampening the motion artifacts might not be needed (or might be performed by a technique other than process 1000). Therefore, process 1020 may be performed without performing process 1000.

In step 1022, eye position and/or movement data of the carrier of the video capture device 101 is accessed. Further details of one embodiment of accessing or tracking eye data is described with respect to FIG. 12.

In step 1024, the eye position and/or movement data is used to move the viewing window 73 in the video stream. Moving the viewing window 73 may include zooming in or out, as well as changing the coordinates (relative to the full screen) without zooming. Further details of one embodiment step 1024 is described with respect to FIG. 14.

In one embodiment, the viewing window 73 is moved in the video stream to allow for the carrier of the remote display device 103 to control what portion of the FOV is presented in the remote display 103. Referring back to FIG. 2A, recall that the person watching the remote display device 103 only sees the viewing window 73. Thus, this person may not see any of the full screen video 119 outside the viewing window 73. However, if they are curious about what is outside of the viewing window 73, they might cast their eyes outside of the viewing window 73 to cause the window 73 to move in that direction. As another example, the person might "zoom in" on something within the viewing window 73.

Figure 10C:
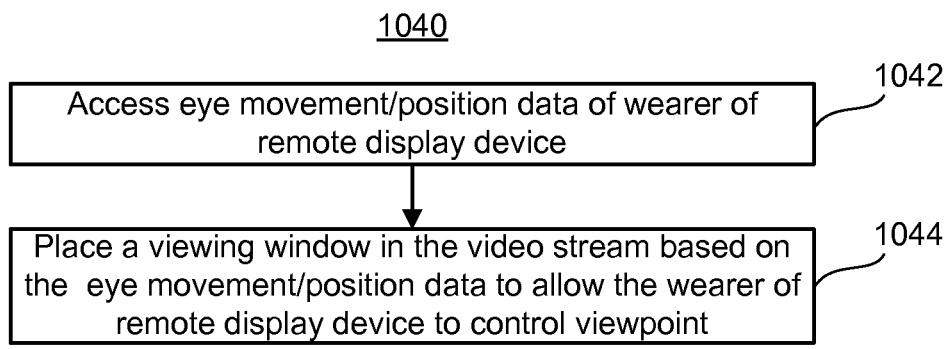
FIG. 10C is a flowchart describing one embodiment of a process for moving a viewing window to allow a carrier of the remote display device to control the viewing window.

FIG. 10C is a flowchart describing one embodiment of a process 1040 for moving a viewing window 73 to allow a carrier of the remote display device 103 to control the viewing window 73. Process 1040 is one embodiment of steps 906 and 908 of process 900 of FIG. 9. Note that the general flow of FIG. 10C may be performed repeatedly to place other viewing windows 73 into the video stream.

Note that process 1040 may be performed instead of process 1000, or in addition to process 1000. For example, if the carrier of the video capture device 101 is walking, it may be desirable to both dampen out motion artifacts using process 1000, as well as allow the person at the remote display device 103 to control the viewing window 73. However, dampening the motion artifacts might not be needed (or might be performed by a technique other than process 1000). Therefore, process 1040 may be performed without performing process 1000.

In step 1042, eye position and/or movement data of the person at the remote display device 103 is accessed. Further details of one embodiment of accessing or tracking eye data is described with respect to FIG. 12.

In step 1044, the eye position and/or movement data is used to move the viewing window 73 in the video stream. Moving the viewing window 73 may include zooming in or out, as well as changing the coordinates (relative to the full screen) without zooming. Further details of one embodiment step 1044 is described with respect to FIG. 14.

Figure 11:
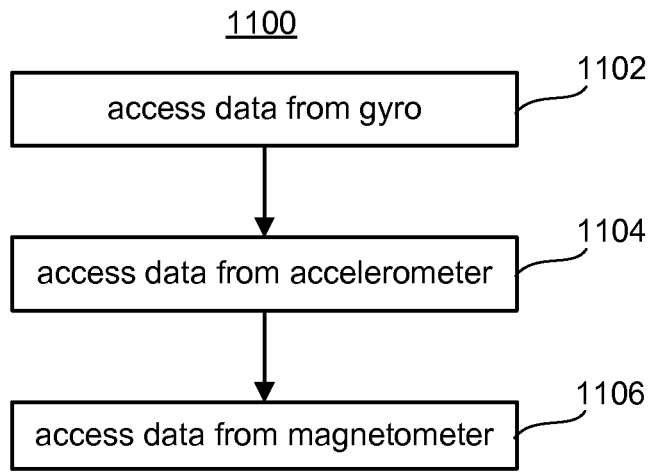
FIG. 11 is a flowchart that describes one embodiment of a process of accessing data that pertains to motion of a carrier of a video capture device.

FIG. 11 is a flowchart that describes one embodiment of a process 1100 of accessing data that pertains to motion of a carrier of a video capture device. Process 1100 is one embodiment of step 1002 of process 1000. In step 1102, processing unit 4 may access data from three axis gyro 132B. The data from the gyro may be used to determined orientation. For example, if the person has titled their head, the data from the gyro may be used to determine the tilt. In step 1104, processing unit 4 may access data from three axis accelerometer 132C. In step 1106, processing unit 4 may access data from three axis magnetometer 132A.

Figure 12:
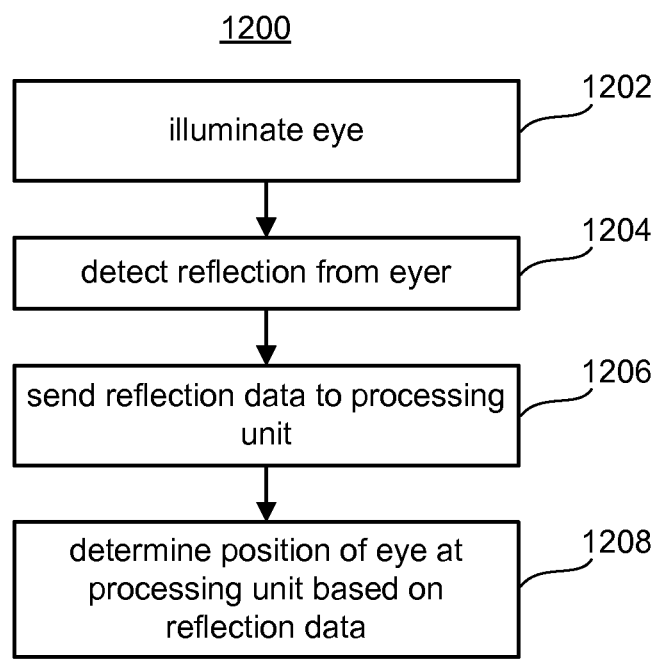
FIG. 12 is a flowchart the describes one embodiment of a process of accessing data that pertains to motion or position of the eye of a person.

FIG. 12 is a flowchart the describes one embodiment of a process 1200 of accessing data that pertains to motion or position of the eye of a person. Process 1200 may be used to determine eye position/movement of either the carrier of the video capture device 101 or the carrier of the remote display device 103. Thus, process 1200 may be used for either step 1022 of FIG. 10B or step 1042 of FIG. 10C.

In step 1202, the eye is illuminated. For example, the eye can be illuminated using infrared light from eye tracking illumination 134A. In step 1204, the reflection from the eye is detected using one or more eye tracking cameras 134B. In step 1206, the reflection data is sent from HMD device 2 to processing unit 4. In step 1208, processing unit 4 will determine the position of the eye based on the reflection data, as discussed above.

FIG. 13 is a flowchart of one embodiment of a process 1300 of determining where to place a viewing window 73 in each frame of the video stream. Process 1300 may be used to compensate for motion of the carrier of the video capture device 101. Process 1300 is one embodiment of step 1004 of FIG. 10A. Process 1300 may use the data collected in process 1100 as input.

Note that prior to process 1300 the viewing window 73 may be placed in a default location in the video stream. In one embodiment, placing the viewing window 73 in a default location in the video stream is achieved by determining a placement for the viewing window 73 in spatial region of each video frame of the video stream. Note that if the video stream is a 3D video stream, this may include determining a default location for a left viewing window 73 in a left video stream and a default location for a right viewing window 73 in a right video stream. An example of a default location is to more or less center the viewing window 73 in the full screen 199, as depicted in FIG. 2A.

In step 1302, an acceleration of the head of the carrier of the video capture device 101 is determined, based on the motion data. This determination may be made based on data from the accelerometer. Note that that video capture device 101 may be located other than on the user's head, in which case acceleration of another body part might be tracked. For example, the user might be holding the video capture device 101 in their hand.

In step 1304, a determination is made whether the acceleration is greater than a threshold. The process 1300 may loop so long as the acceleration does not cross the threshold. Note that by looping until a relatively high acceleration occurs, more intensive processing of analyzing video frames may be avoided.

If the acceleration crosses the threshold, this may indicate that there has been a sudden movement of the carrier's head that should be dampened by moving the viewing window 73. Thus, the process 1300 may go on to analyze the video stream. Note that once the acceleration crosses the threshold, some minimum number of video frames might be analyzed. This is indicated by step 1306 checking whether there are more video frames to analyze.

In step 1308, the video stream is analyzed to determine a degree and a direction of motion in the video stream. One technique for determining the degree and direction of motion is to look for motion blur in a single video frame. Step 1308 may also perform a comparison of two video frames. For example, edge detection may be used to determine the relative position of one or more objects in each of two successive video frames. The difference in position may be used to determine a degree and direction of motion in the video stream. For a 3D video stream, the analysis may be of right, left, or both video streams.

Another technique for determining a degree and a direction of motion is to examine data from the three-axis gyroscope. For example, the data from the gyro may be used to determine the head angle of a person wearing an HMD. As a particular example, the gyro data may indicate that the person's head has tilted upwards recently. The amount of tilt may be used to determine the degree and direction of motion. Here, the degree and direction of motion could be the amount by which the FOV (or some object in the FOV) changes. The degree and direction of motion may be relative to any point in the recent past.

In step 1310, a determination is made whether the degree of motion for the present video frame is greater than a threshold. This may be determined based on the amount of motion blur in the present video frame. It could also be determined based on an amount by which an object shifted between the present video frame and the preceding video frame. It could also be determined based on sensor data, such as gyroscope data. Note that not all motion needs to be removed. For example, if the person is slowly moving their head, this motion may not need to be removed. Therefore, if the motion is less than the threshold for this video frame, then the process may return to step 1306 to process the next video frame.

Step 1312 may be performed if there should be an adjustment of the viewing window 73 within the full screen 201. In step 1312, a position for the viewing window 73 is determined for the present video frame being analyzed. The degree and direction of motion that was determined in step 1308 may be used to determine where to position the viewing window 73. Thus, the degree and direction of motion may be used to determine how to dampen motion. Note that step 1312 may determine a position for a left viewing window 73 and a right viewing window 73. The process 1300 may then return to step 1306 to process the next video frame.

Figure 14:
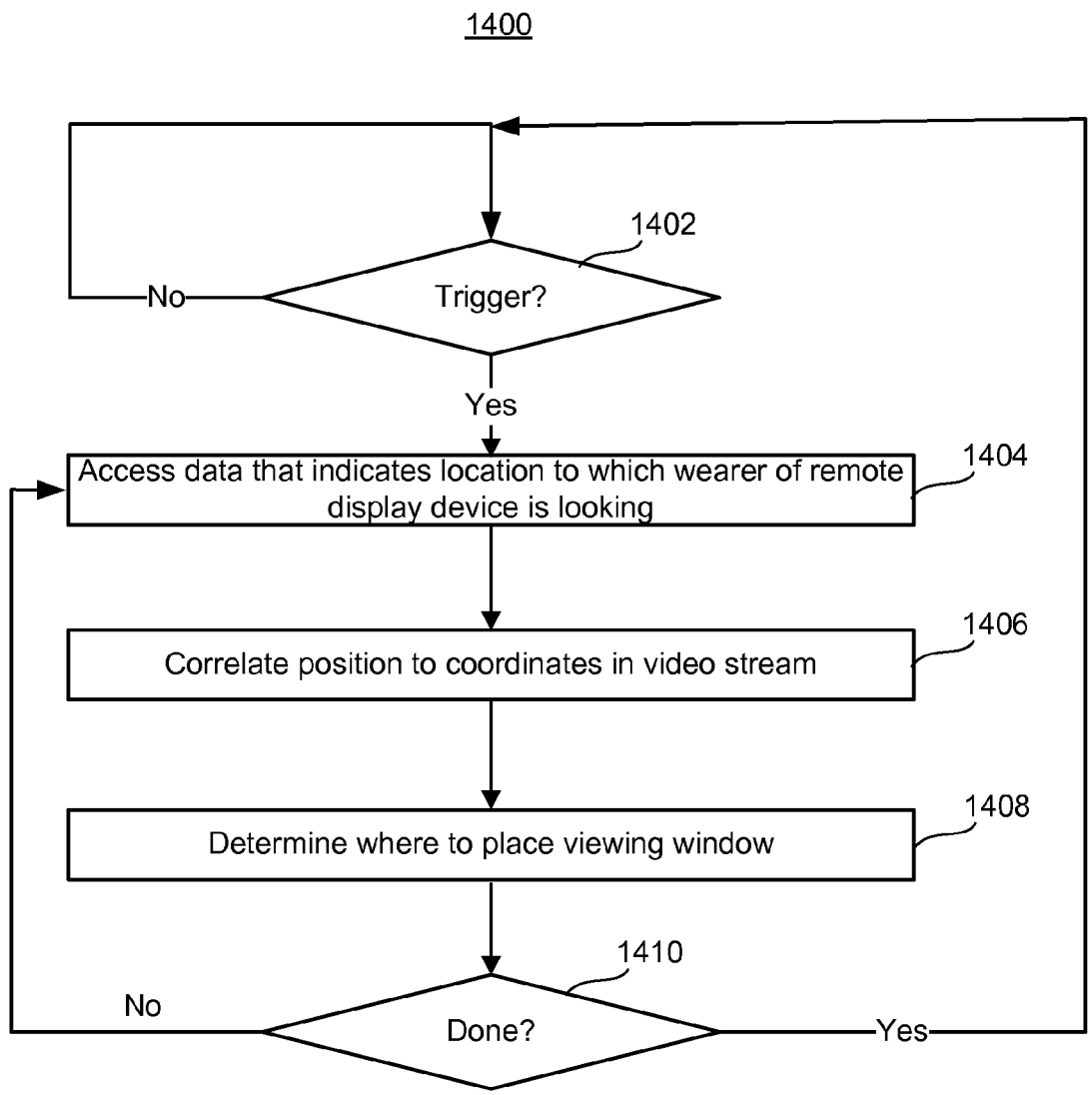
FIG. 14 is a flowchart describing one embodiment of a process of placing the viewing window in the video stream based on detection of eye position or movement.

As previously discussed, the viewing window 73 may be placed based on a person's eye position. FIG. 14 is a flowchart describing one embodiment of a process 1400 of placing the viewing window 73 in the video stream based on detection of eye position or movement. Process 1400 may be used to allow the carrier of the video capture device 101 to control what is presented at the remote display device 103. As one example, the carrier can fix his/her gaze on an object in the FOV to cause the viewing window 73 to contain that object. As noted previously, much of the full FOV might not be displayed at the remote display device 103.

Note the process 1400 may also be used to allow the carrier of the remote display device 103 to control what is presented at the remote display device. As one example, the carrier might normally look relatively straight ahead when viewing the viewing window 73 in the HMD. However, the carrier might move their gaze to the upper left, which could indicate a greater interest in that portion of the video stream. Thus, the viewing window 73 could be adjusted to show that spatial portion of the full screen video 201. It might be expected that after shifting the viewing window 73 sufficiently that the person would then re-shift their gaze to look more or less straight ahead as the object of interest is not centered for the user.

In some embodiments, the ability to control the viewing window 73 may be triggered by some event. As one example, the carrier of the video capture device 101 or the remote display device 103 could enter some command to cause this mode to take effect. The command might be a voice command, a gesture that is recognized by a video capture device, certain eye movements, etc.

In step 1404, data is accessed that describes the location to which the person (e.g., carrier of the video capture device 101 or remote display device 103) is looking. Process 1200 may be used to determine this data. Note that in some embodiments, the trigger of step 1402 is eye movement or fixation. For example, the trigger could be the person fixing their gaze in the same position for a certain period of time. Therefore, step 1402 could follow step 1404.

In step 1406, the location to which the person is looking is correlated to a spatial position in the video stream. First, an example is discussed for a person watching the remote video display 103 which is a HMD. If the person is wearing a HMD, then the direction of the eye gaze can be used, along with knowledge of where the video image is being presented on the HMD to determine what the person is looking at (e.g., a spatial position in the video stream). For example, the direction of eye gaze may indicate that the person is looking to the upper right corner of the viewing window 73, as it is being presented in the HMD.

For the carrier of the video capture device 101, it may be beneficial to know the relative position of the camera's optical axis to the person's head. If the person is wearing an HMD as a pair of glasses, this may be determined fairly easily. For example, referring to FIG. 4, the optical axis of camera 101C relative to the HMD 2 may be known. Thus, determining the optical axis of camera 101C relative to the person's head position may be easily determined. However, even for other video capture devices 101, the relationship between the camera's optical axis and the user's head may be determined. For example, the person may be instructed to wear the video capture device 101 such that its optical axis points straight ahead. Once this relationship of head position to optical axis is known, the position in the FOV to which the person is looking may be determined. Therefore, the spatial position in the video stream may be determined.

In step 1408, a position for the viewing window 73 is determined in order to place the viewing window 73 in a place that represents the location the person is looking at. For example, if the carrier of the video capture device 101 is looking at the house in FIG. 2A, then the viewing window 73 may be placed in that spatial region of the video stream. As another example, if the wearer of the HMD 2 looks to the upper right of the viewing window 73, the display may zoom in to that region. Thus, the person may obtain a closer look at something. Note that the decision to zoom or move without zooming may be determined by a command (voice, gesture, etc.).

In optional step 1410, a determination is made whether the viewing window 73 has been moved sufficiently. For a person wearing the remote video display 103, this check may be performed by determining if the person is now looking more or less straight ahead. In one embodiment, the person is allowed to enter a command that indicates that they are satisfied with how the viewing window 73 has been re-positioned. For example, the person might enter a voice command or a gesture that indicates that movement of the viewing window 73 should stop. If it is determined that the viewing window 73 has not yet been placed into the final position, then the process 1400 may return to step 1404. Once the viewing window 73 is in the final position, the process 1400 may return to step 1402 to wait for the trigger.

Another purpose for which the viewing window 73 may be used is to help bring objects in the remote video display 103 into better focus. For some 3D images, there may be a right video stream and a left video stream. Each video stream may be fed to a separate remote display 103. For example, one stream could be fed to the right lens and the other to the left lens of the HMD 2. Alternatively, each stream may be presented on the same display, but in a different manner such that a person wearing special glasses perceives one stream with their right eye and the other with their left eye. Each object in the 3D image may have a z-value or depth value, which may be based on how far it is from the capture device 101. However, since the display only has two dimensions (e.g., x and y), note that to achieve the effect of depth, a given object may have a different (x, y) position in the right stream than the left stream. In some cases, if there is too much separation between the (x, y) positions, then the person may not be able to focus on the object. For example, the person may end up seeing a double image of a close object. This effect could be for any object, but may be more prevalent for objects that have low z-values (e.g., are close to the capture device).

Figure 15:
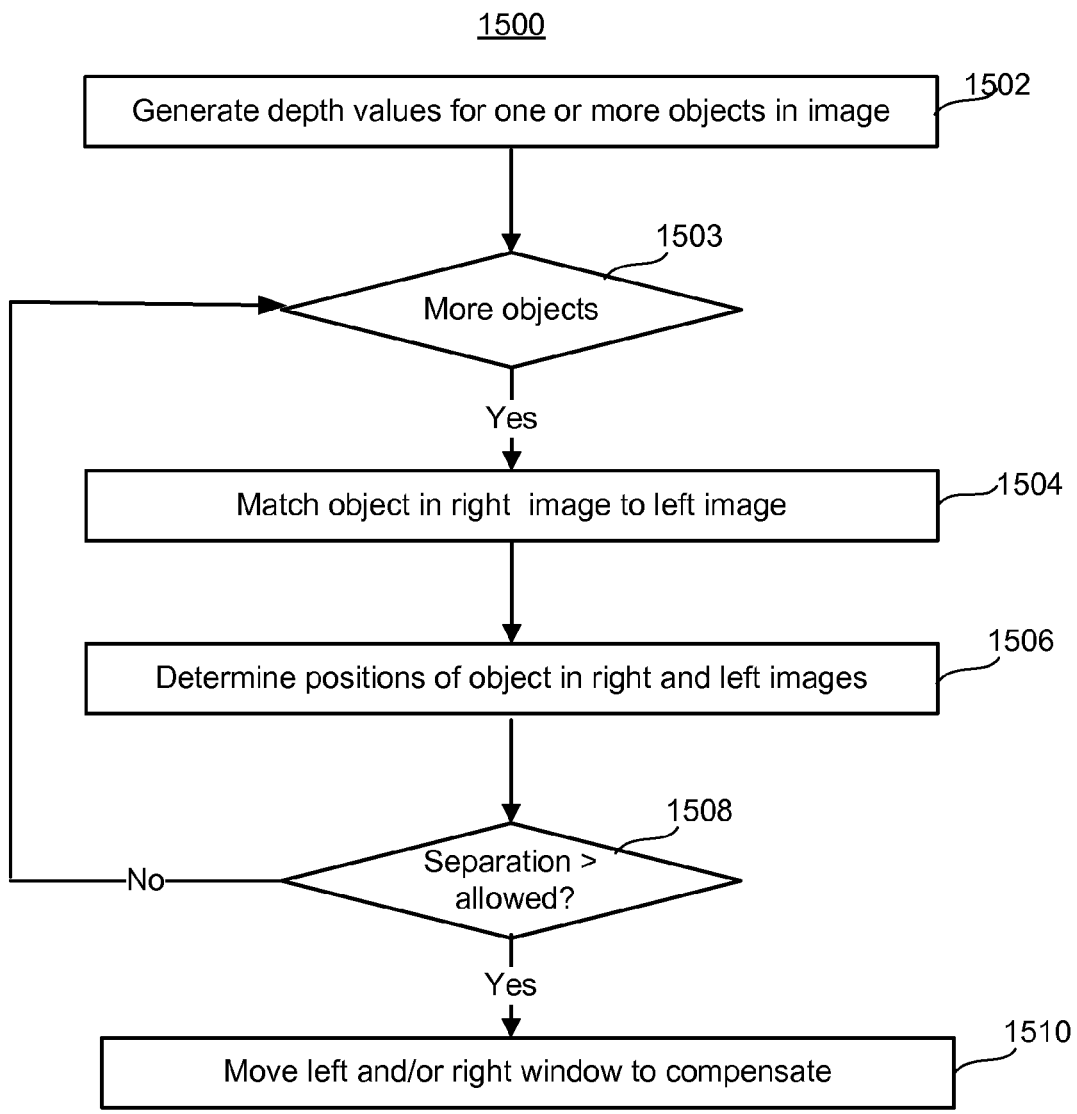
FIG. 15 is flowchart describing one embodiment of a process of correcting for out-of-focus objects by re-positioning viewing windows.

FIG. 15 is flowchart describing one embodiment of a process 1500 of correcting for out-of-focus objects by re-positioning viewing windows 73. In step 1502, depth values are generated for one or more objects in the video stream. In some cases, one video frame is analyzed. Thus, this process 1500 may be performed once at some regular interval, or at any convenient time. For example, if it appears that the content of the video stream has changed, the process 1500 could be performed. Process 1500 analyzes one or more objects. Step 1503 determines whether there are more objects to analyze. In some embodiments, close objects are analyzed first. In one embodiment, relatively large objects are analyzed first. Not all objects need to be analyzed.

In step 1504, an object A in the right image is matched to an object B in the left image. In step 1506, the position of object A and B in their respective images is determined. For example, this might be an (x, y) position, or any other convenient coordinate system. Based on their positions, a separation of the objects is determined. In one embodiment, this separation is along the x-axis. One reason for determining separation on the x-axis is that the ability to accurately focus on the object may be a function of the physical separation of the user's eyes. More specifically, this may be the distance between the user's pupils.

In step 1508, a determination is made whether the difference in location between the two objects (e.g., objects A and B) is greater than an allowed amount. The allowed amount may be the physical separation of the user's eyes, or a default value that may be based on expected separation for users in general. If the separation is acceptable, then another object may be analyzed (return to step 1503).

If the object separation is greater than the allowed amount, then corrective measures may be taken. In step 1510, one or both of the left viewing window 73 and/or the right viewing window is moved such that the separation between the object is reduced.

After moving the windows 73, processing could stop. Note that by moving the windows 73 to bring this object into focus, it is possible that other objects could appear as two separate objects on the remote display 103. In one embodiment, blurring of these objects is performed such that they no longer appear as two separate objects.

In some embodiments, one or more steps of any of the processes described herein may be performed by executing instructions on one or more processors. These instructions may be stored on computer storage media. Computer storage media includes both volatile and nonvolatile media, removable and non-removable media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
accessing a video stream from a video capture device having a field of view;
accessing data that describes movement of a person that carries the video capture device wherein the field of view moves over time due to movement of the video capture device, including determining an acceleration of the head of the person;
placing a viewing window in the video stream based on the data that describes movement of the person, the viewing window includes only a portion of the field of view, including moving the viewing window to dampen motion of the video capture device caused by motion of the person that carries the video capture device when the movement of the person is greater than a threshold and not moving the viewing window to dampen the motion when the movement of the person is less than the threshold, wherein the portion of the field of view is kept constant in the viewing window when dampening the motion, wherein the placing the viewing window in the video stream includes only dampening the motion of the video capture device if the acceleration of the person's head is greater than a threshold; and providing the viewing window to a display device that is remote from the video capture device in accordance with the placing of the viewing window in the video stream.

2. The method of claim 1, wherein:
the accessing the data that describes movement of a person that carries the video capture device includes accessing eye position data of the person that carries the video capture device.

3. The method of claim 2, further comprising determining a position in the field of view (FOV) of the video capture device at which the person is looking, wherein:
the moving the viewing window in the video stream includes moving the viewing window to allow the person that carries the video capture device to control what spatial region of the video stream is displayed on the remote display device, including placing the viewing window at the spatial region that corresponds to the position in the FOV at which the person that carries the video capture device is looking.

4. The method of claim 1, wherein:
the person that carries the video capture device is a first person; and further comprising:
accessing eye position data from a second person near the remote display device, wherein the eye position data indicates that the second person has cast their eye position outside of the viewing window; and
moving the viewing window in the video stream in response to the second person casting their eye position outside of the viewing window to allow the second person to control what portion of the field of view is presented in the remote display device.

5. The method of claim 1, wherein the video stream is a 3D video signal having a left stream and a right stream, and further comprising:
coordinating a right window for the right stream and a left window for the left stream to bring an object in the 3D video signal into focus at the remote display device.

6. A system comprising:
a mobile video capture device having a field of view, wherein the field of view moves over time due to movement of the mobile video capture device;
at least one sensor which detects motion of a person that carries the mobile video capture device, the at least one sensor determines an acceleration of the head of the person;
a control circuit which receives a video stream from the mobile video capture device and determines at least one viewing window within the video stream that dampens motion of the video capture device caused by motion of the person when the motion of the person is greater than a threshold and does not dampen the motion when the motion of the person is less than the threshold, the viewing window includes only a portion of the field of view of the mobile video capture device, the portion of the field of view is kept constant in the viewing window when dampening the motion, wherein the determining at least one viewing window within the video stream that dampens motion of the video capture device includes only dampening the motion of the video capture device if the acceleration of the person's head is greater than a threshold; and
a communication circuit that provides the viewing window to a remote display device in accordance with the placing of the viewing window in the video stream.

7. The system of claim 6, further comprising:
a mechanism for tracking eye position of the person that carries the mobile video capture, the control circuit receives data from the mechanism that indicates the position of the person's eye, the control circuit adjusts position of the at least one viewing window within the video stream to allow the person that carries the mobile video capture to control which spatial subset of the video stream in contained in the at least one viewing window.

8. The system of claim 6, wherein the mobile video capture device is part of a head mounted display (HMD).

9. The system of claim 6, further comprising:
a head mounted display (HMD) that displays the at least one viewing window, the HMD being the remote display device, the mobile video capture device is carried by a first person, the HMD including a mechanism for tracking eye position of a second person that carries the HMD; and
logic that receives the eye position of the second person, wherein the eye position indicates that the second person has cast their eye position outside of the viewing window, wherein the logic adjusts the position of the at least one viewing window within the video stream to allow the second person to control which spatial region of the video stream in contained in the at least one viewing window.

10. The system of claim 9, further comprising a mechanism in the mobile video capture device for tracking eye position of the first person, the control circuit adjusts position of the at least one viewing window within the video stream to allow the first person to control which spatial subset of the video stream in contained in the at least one viewing window.

11. The system of claim 6, wherein the video stream is a 3D video signal having a left stream and a right stream, the at least one viewing window includes a right window for the right stream and a left window for the left stream, the control circuit coordinates the right window and the left window to bring an object in the 3D video signal into focus at the remote display device.

12. A method comprising:
transmitting at least a portion of a 3D video stream from a mobile video capture device having a field of view to a remote display device, the 3D video stream having a right stream with successive video frames and a left stream with successive video frames, the field of view moves over time due to movement of the mobile video capture device;
accessing movement data that describes movement of a first person that carries the mobile video capture device, including determining an acceleration of the head of the person;
positioning a first viewing window in each frame of the right stream and a second viewing window in each frame of the left stream based on the movement data to compensate for motion of the mobile video capture device due to the movement of the first person, including moving the first and second viewing windows to dampen motion of the mobile video capture device caused by the movement of the first person if the movement of the first person is greater than a threshold and not moving the first and second viewing windows to dampen the motion of the mobile video capture device caused by the movement of the first person if the movement of the first person is less than the threshold, the first and second viewing windows each include only a portion of the field of view of the mobile video capture device, the portion of the field of view is kept constant in the first and second viewing windows when dampening the motion, wherein the positioning a first viewing window in each frame of the right stream and a second viewing window in each frame of the left stream includes only dampening the movement of the mobile video capture device if the acceleration of the head of the person is greater than a threshold; and displaying the first and second viewing windows on the remote display device.

13. The method of claim 12, wherein:

the accessing movement data that describes movement of the first person includes accessing eye position data of the first person.

14. The method of claim 13, wherein:

the positioning the first and second viewing windows includes moving the first and second viewing windows to allow the first person to control what spatial region of the 3D video stream is displayed on the remote display device.

15. The method of claim 14, further comprising:

accessing data that describes eye position of a carrier of the remote display device, the positioning the first and second viewing windows includes moving the first and second viewing windows to allow the carrier of the remote display device to control what spatial region of the 3D video stream is displayed on the remote display device.

16. The method of claim 12, further comprising:

coordinating the first and second viewing windows to bring an object in the 3D video stream into focus at the remote display device.

17. The method of claim 1, wherein moving the viewing window to dampen motion of the video capture device caused by motion of the person that carries the video capture device when the movement of the person is greater than a threshold and not moving the viewing window to dampen the motion when the movement of the person is less than the threshold further comprises:

analyzing the video stream to determine a degree of motion in the video stream in response to the acceleration of the person's head being greater than the threshold for the acceleration; and only dampening motion of the video capture device when the motion in the video stream is greater than a threshold for motion in the video stream.

18. The method of claim 17, wherein the analyzing the video stream to determine a degree of motion in the video stream in response to the acceleration of the person's head being greater than the threshold comprises:

analyzing a degree of motion associated with a single frame of the video stream; and only dampening motion of the video capture device when the degree of motion in the single frame of the video stream is greater than a threshold for the degree of motion associated with the single frame.

19. The system of claim 6 wherein, when the control circuit dampens motion of the video capture device caused by motion of the person when the motion of the person is greater than a threshold and does not dampen the motion when the motion of the person is less than the threshold, the control circuit:

analyzes the video stream to determine a degree of motion in the video stream in response to the acceleration of the person's head being greater than the threshold for the acceleration; and only dampens motion of the video capture device when the motion in the video stream is greater than a threshold for motion in the video stream.

20. The system of claim 19 wherein, when the control circuit analyzes the video stream to determine a degree of motion in the video stream in response to the acceleration of the person's head being greater than the threshold, the control circuit:

analyzes a degree of motion in a single frame of the video stream; and only dampens motion of the video capture device when the degree of motion in the single frame of the video stream is greater than a threshold for the degree of motion in the single frame.

* * * * *